United States Patent
Zeiler et al.

(10) Patent No.: US 11,916,242 B2
(45) Date of Patent: Feb. 27, 2024

(54) COMMERCIAL FLEXIBLE BATTERY PACK WITH SECONDARY OUTPUT CONTROL

(71) Applicant: BRIGGS & STRATTON, LLC, Wauwatosa, WI (US)

(72) Inventors: Jeffrey Zeiler, Wauwatosa, WI (US); Jacob Schmalz, Milwaukee, WI (US); Nicholas Ziedler, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 244 days.

(21) Appl. No.: 17/065,832

(22) Filed: Oct. 8, 2020

(65) Prior Publication Data
US 2021/0111384 A1    Apr. 15, 2021

Related U.S. Application Data

(60) Provisional application No. 62/913,871, filed on Oct. 11, 2019.

(51) Int. Cl.
| | |
|---|---|
| H01M 50/20 | (2021.01) |
| H01M 10/42 | (2006.01) |
| H01M 10/0525 | (2010.01) |
| H01M 50/502 | (2021.01) |
| H01M 50/529 | (2021.01) |
| H01M 50/557 | (2021.01) |

(52) U.S. Cl.
CPC ....... *H01M 50/20* (2021.01); *H01M 10/0525* (2013.01); *H01M 10/425* (2013.01); *H01M 50/502* (2021.01); *H01M 50/529* (2021.01); *H01M 50/557* (2021.01); *H01M 2010/4271* (2013.01); *H01M 2010/4278* (2013.01)

(58) Field of Classification Search
CPC ..... H01M 50/543–569; H01M 10/425; H01M 50/20; H01M 50/502; H01M 50/529; H01M 2010/4271; H01M 2010/4278
See application file for complete search history.

(56) References Cited

U.S. PATENT DOCUMENTS

| | | | |
|---|---|---|---|
| 10,347,954 B2 | 7/2019 | Rief et al. | |
| 2003/0052801 A1* | 3/2003 | McClure | H04L 12/66 341/50 |
| 2009/0325049 A1* | 12/2009 | Niedzwiecki | H01M 50/264 429/100 |
| 2010/0226194 A1* | 9/2010 | Huang | G11C 16/22 365/229 |
| 2012/0129024 A1* | 5/2012 | Marchio | H01M 10/647 429/120 |

(Continued)

*Primary Examiner* — Scott J. Chmielecki
(74) *Attorney, Agent, or Firm* — Foley & Lardner LLP

(57) ABSTRACT

A battery pack includes a cell module assembly, a primary power output, and a secondary output connector. The cell module assembly includes several lithium-ion battery cells connected in parallel. The primary power output includes a pair of terminals for connection to equipment to be powered by the battery pack. The secondary output connector includes a secondary power output for connection to equipment to be powered by the battery pack and includes an enable input. The primary power output is configured to supply electrical power at a voltage higher than the secondary power output connector. The secondary power output is controllable through the enable input to selectively supply electrical power from the secondary power output.

19 Claims, 17 Drawing Sheets

| Socket # | Function | Color |
|---|---|---|
| 1 | E-stop Request Input | Orange |
| 2 | Discharge Enable Input* | Brown |
| 3 | +12V Output | Red |
| 4 | CAN0 High* | Yellow |
| 5 | CAN0 Low* | Green |
| 6 | Ground | Black |
| 7 | Charge Enable Input* | Pink |
| 8 | Alarm Output | Light Grey |
| 9 | +5V Signal Supply* | Blue |
| 10 | Fault Output | Dark Grey |
| 11 | (Reserved, not Connected) | (N/A) |
| 12 | 12V Always-on Enable Input | White w/stripe |
| 13 | (Reserved, not Connected) | (N/A) |
| 14 | (Optional Signal Ground) | Black |
| 15 | CAN1 High | Yellow w/stripe |
| 16 | CAN1 Low | Green w/stripe |
| 17 | (Optional Signal Ground) | Black |
| 18 | (Reserved, not Connected) | (N/A) |
| 19 | (Reserved, Output) | (Tan) |
| 20 | (Reserved, not Connected) | (N/A) |

*Denotes Required Connection

(56) References Cited

U.S. PATENT DOCUMENTS

| | | | |
|---|---|---|---|
| 2014/0091769 A1* | 4/2014 | Kim | H02J 7/04 |
| | | | 320/134 |
| 2014/0234062 A1* | 8/2014 | Adachi | H01M 10/6551 |
| | | | 414/687 |
| 2014/0301000 A1* | 10/2014 | Takahashi | H01M 10/482 |
| | | | 361/42 |
| 2017/0163054 A1* | 6/2017 | Suda | H02J 7/0014 |
| 2018/0083237 A1* | 3/2018 | Wang | H01M 50/296 |
| 2018/0130993 A1* | 5/2018 | Yang | H01M 10/0454 |
| 2018/0326855 A1* | 11/2018 | Poeppel | H01M 10/425 |
| 2018/0351151 A1* | 12/2018 | Marchal | B60L 50/64 |
| 2019/0075724 A1* | 3/2019 | Becke | A01D 69/02 |
| 2019/0245191 A1* | 8/2019 | Doi | H01M 50/553 |
| 2019/0259985 A1* | 8/2019 | Hanawa | H02J 7/0024 |
| 2019/0305283 A1* | 10/2019 | Yanagida | H01M 50/507 |
| 2020/0220225 A1* | 7/2020 | Lemke | H01M 10/44 |
| 2020/0381782 A1* | 12/2020 | Yang | H02J 9/00 |
| 2022/0150141 A1* | 5/2022 | Reinert | G06N 3/045 |

* cited by examiner

| Socket # | Function | Color |
|---|---|---|
| 1 | E-stop Request Input | Orange |
| 2 | Discharge Enable Input* | Brown |
| 3 | +12V Output | Red |
| 4 | CAN0 High* | Yellow |
| 5 | CAN0 Low* | Green |
| 6 | Ground | Black |
| 7 | Charge Enable Input* | Pink |
| 8 | Alarm Output | Light Grey |
| 9 | +5V Signal Supply* | Blue |
| 10 | Fault Output | Dark Grey |
| 11 | (Reserved, not Connected) | (N/A) |
| 12 | 12V Always-on Enable Input | White w/stripe |
| 13 | (Reserved, not Connected) | (N/A) |
| 14 | (Optional Signal Ground) | Black |
| 15 | CAN1 High | Yellow w/stripe |
| 16 | CAN1 Low | Green w/stripe |
| 17 | (Optional Signal Ground) | Black |
| 18 | (Reserved, not Connected) | (N/A) |
| 19 | (Reserved, Output) | (Tan) |
| 20 | (Reserved, not Connected) | (N/A) |

*Denotes Required Connection

FIG. 21

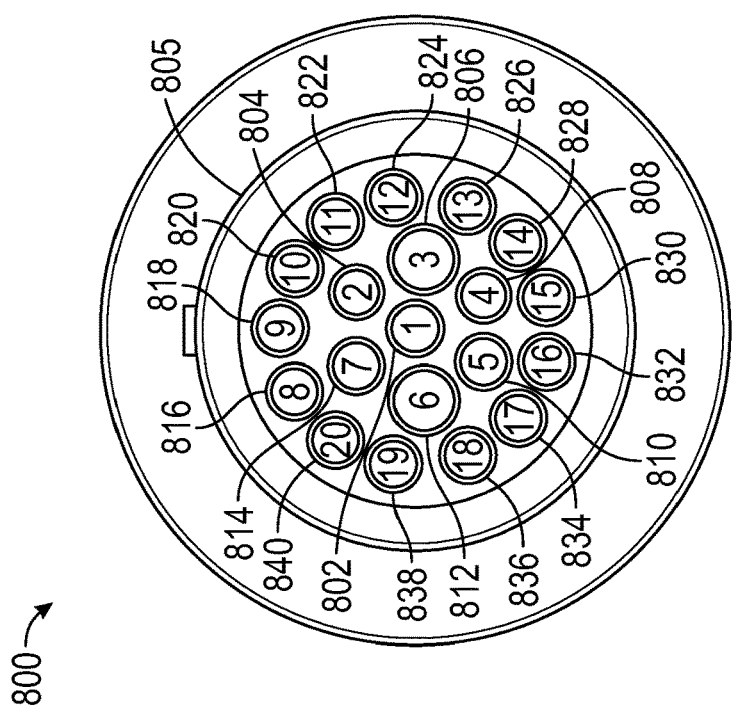

COMMERCIAL FLEXIBLE BATTERY PACK WITH SECONDARY OUTPUT CONTROL

CROSS-REFERENCE TO RELATED APPLICATION

This application claims priority to U.S. Provisional Patent Application No. 62/913,871, filed Oct. 11, 2019, the content of which is hereby incorporated by reference in its entirety.

BACKGROUND

The present disclosure relates generally to battery packs. More specifically, the present disclosure relates to reusing components of battery packs.

Battery packs can be used with different types of equipment, including outdoor power equipment, vehicles, aerial man lifts, floor care devices, golf carts, lift trucks and other industrial vehicles, recreational utility vehicles, industrial utility vehicles, lawn and garden equipment, and energy storage or battery backup systems. Outdoor power equipment includes lawn mowers, riding tractors, snow throwers, pressure washers, portable generators, tillers, log splitters, zero-turn radius mowers, walk-behind mowers, riding mowers, and turf equipment such as spreaders, sprayers, seeders, rakes, and blowers. Outdoor power equipment may, for example, use one or more electric motors to drive an implement, such as a rotary blade of a lawn mower, a pump of a pressure washer, the auger of a snow thrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like.

SUMMARY

One exemplary embodiment relates to a battery pack. The battery pack includes a cell module assembly, a primary power output, and a secondary output connector. The cell module assembly includes several lithium-ion battery cells connected in parallel. The primary power output includes a pair of terminals for connection to equipment to be powered by the battery pack. The secondary output connector includes a secondary power output for connection to equipment to be powered by the battery pack and includes an enable input. The primary power output is configured to supply electrical power at a voltage higher than the secondary power output connector. The secondary power output is controllable through the enable input to selectively supply electrical power from the secondary power output.

Another exemplary embodiment relates to a battery pack. The battery pack includes a housing, a cell module assembly, a 48 Volt primary power output, and a 12 Volt secondary power output connector. The cell module assembly is received within the housing, and has a plurality of lithium-ion battery cells connected in parallel. The 48 Volt primary power output includes a pair of terminals for connection to equipment to be powered by the battery pack. The 12 Volt secondary power output connector includes a secondary power output for connection to equipment to be powered by the battery pack and an enable input. The secondary power output is controllable through the enable input to selectively supply electrical power from the secondary power output. The pair of terminals and the secondary power output connector are arranged on a connector plate coupled to the housing.

Another exemplary embodiment relates to a battery pack. The battery pack includes a cradle, a housing, a cell module assembly, a primary power output, and a secondary power output. The cradle defines a base surface, and suspends the housing above the base surface (e.g., the cradle supports the housing away from the ground). The cell module assembly is received within the housing, and has several lithium-ion battery cells connected in parallel. The primary power output includes a pair of terminals formed through the housing for connection to equipment to be powered by the battery pack. The secondary power output connector is formed through the housing as well. The secondary power output connector includes a secondary power output for connection to equipment to be powered by the battery pack and an enable input. The primary power output is configured to supply electrical power at a voltage higher than the secondary power output connector. The secondary power output is controllable through the enable input to selectively supply electrical power from the secondary power output.

The invention is capable of other embodiments and of being carried out in various ways. Alternative exemplary embodiments relate to other features and combinations of features as may be recited herein.

BRIEF DESCRIPTION OF THE DRAWINGS

FIG. 21 is a schematic view and table of a battery, viewed from a wire-entry side and showing communications connect pinouts, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
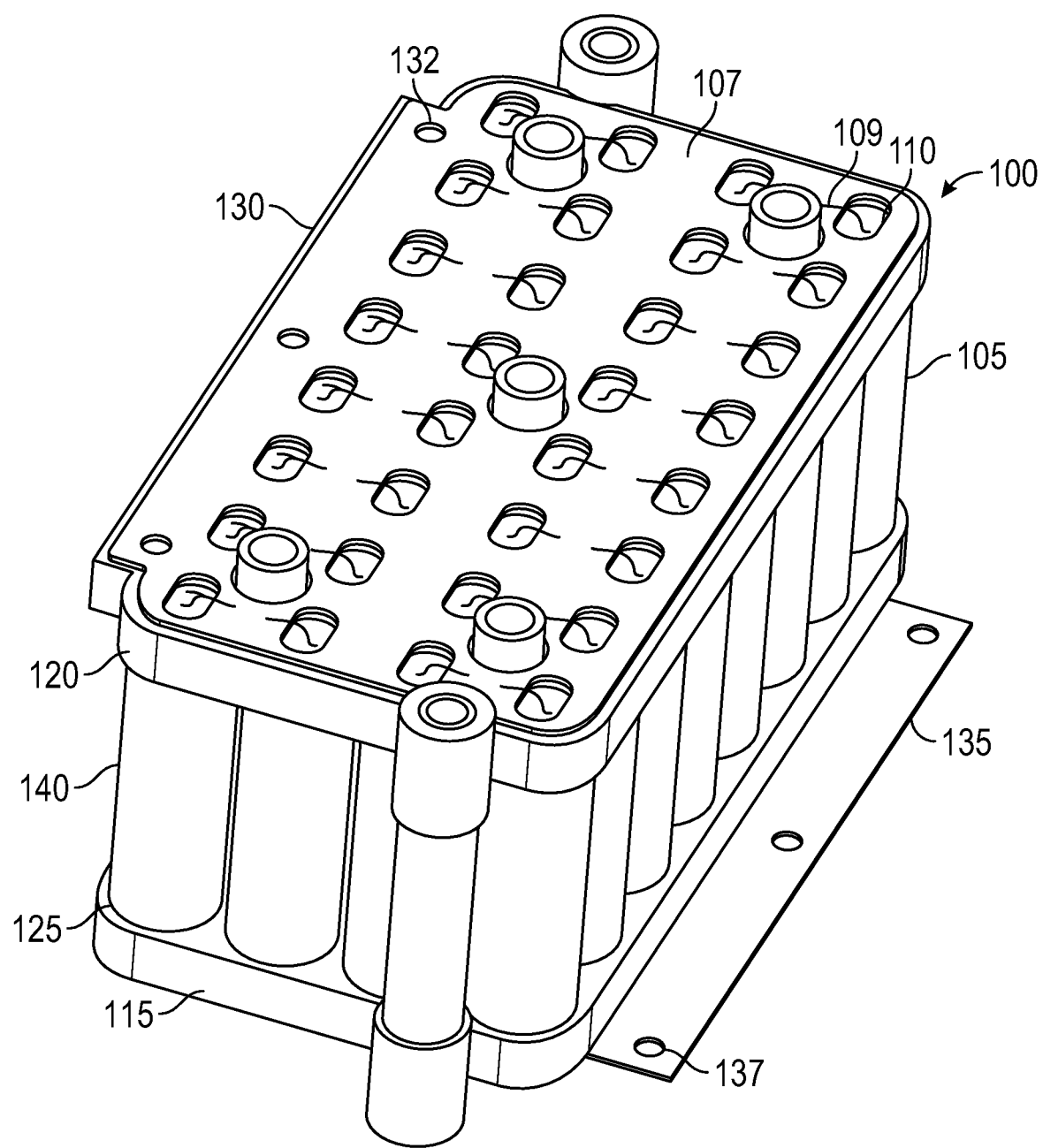
FIG. 1 is a perspective view of a cell module assembly, according to an exemplary embodiment.

Referring to FIG. 1, a cell module assembly ("CMA") 100 is illustrated according to an exemplary embodiment. The CMA 100 includes multiple battery cells 105. In some embodiments, the battery cells 105 are lithium-ion battery cells. In some embodiments the battery cells 105 are lithium-ion battery cells rated at 3.6 volts and 3 amp-hours. As illustrated, the CMA 100 includes thirty-two battery cells 105 arranged in four rows of eight cells 105 each. The battery cells 105 are electrically connected to one another. In the illustrated embodiment, each battery cell 105 is electrically connected to a positive collector plate 107 by a wire bond 109 and electrically connected to a negative collector plate (not shown) by a wire bond (not shown). The battery cells 105 are connected to a top plate 110 and a bottom plate 115 with the positive terminals 120 of the battery cells 105 located at the top plate 110 and the negative terminals 125 of the battery cells 105 located at the bottom plate 115. The positive collector plate 109 is secured to the top plate 110 (e.g., by an adhesive). The negative collector plate is secured to the bottom plate 115 (e.g., by an adhesive). In some embodiments, all thirty-two battery cells 105 are connected in parallel in a 1S32P (one series, thirty-two parallel) arrangement. In other embodiments, two groups of sixteen battery cells 105 are connected in parallel with the two groups connected in series in a 2S16P (two series, sixteen parallel) arrangement. Arranging a relatively large number of battery cells 105 in parallel in this manner helps to slow the degradation of the charge capacity of the CMA 100. In other embodiments, the number of battery cells 105 in the CMA 100 may be greater or fewer and the connection arrangements between the battery cells 105 may vary depending on the ratings needed from a particular CMA (e.g., voltage, capacity, power, etc.).

The top plate 110 includes a positive terminal 130 for connection (e.g., with fasteners via holes 132) to another CMA 100 or to a positive bus (not shown) for electrically connecting the CMA 100 or a collection of CMAs 100 to a device to be powered. The bottom plate 115 includes a negative terminal 135 for connection (e.g., with fasteners via holes 137) to another CMA 100 or to a negative bus (not shown) for electrically connecting the CMA 100 or a collection of CMAs 100 to device to be powered. The battery cells 105 can also be reversed relative to the top plate 110 and the bottom plate 115. For example, in some embodiments the top plate 110 is connected to the negative terminals 125 of the battery cells 105 and has a negative terminal 130 and the bottom plate 115 is connected to the positive terminals 120 of the battery cells 105 and has a positive terminal 135. In some embodiments, the terminals 130 and 135 are components of the collector plate (i.e., the positive collector plate 109 and the negative collector plate, respectively) used to electrically connect the battery cells 105 to each other. For example, the positive collector plate 109 and the terminal 130 can be formed as a single, continuous plate. Each CMA 100 may be identified with an individual identifier (e.g., serial number, bar code, etc.) for use by the CMA manufacturer to track, categorize, evaluate, or record information or data about an individual CMA.

The CMA 100 also includes an electronic controller 140. The electronic controller 140 can include a processor and a memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or may include volatile memory or non-volatile memory. The memory device may include database components, object code components, script components, or any other type of information structure for supporting the various activities and information structures described in the present application. According to an exemplary embodiment, the memory device is communicably connected to the processor via a processing circuit and includes computer code for executing (e.g., by processing circuit and/or processor) one or more processes described herein.

The controller 140 also implements a battery management system (BMS) for regulating the currents and/or voltages involved in the charging and discharging processes in order to ensure that the battery cells 105 are not damaged or otherwise brought to problematic charge states. For example, the BMS may block an electrical current from being delivered to the cells 105, or may block a current being drawn from the cells 105 based on the current and voltage properties of the signal and/or of the CMA 100. The BMS may also implement controls based on a temperature as detected by a temperature sensor and regulate operation of the CMA 100 based on over temperature or under temperature conditions determined by the detected temperature.

Figure 2:
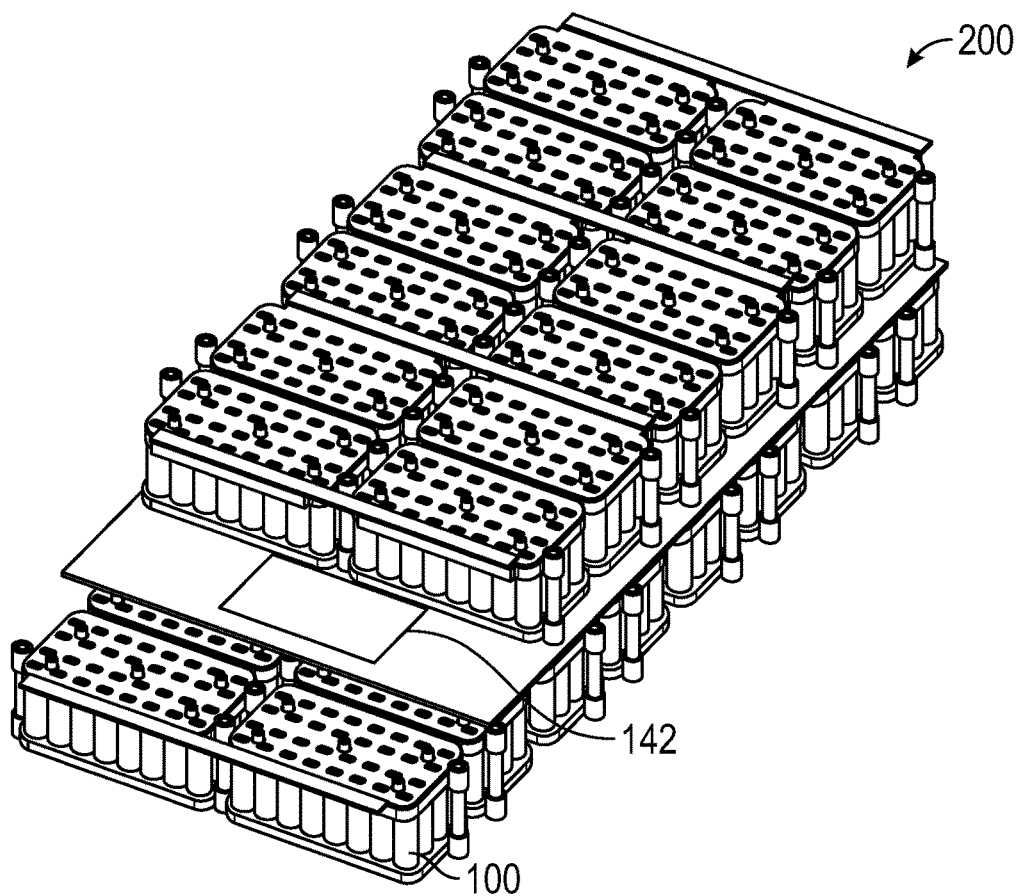
FIG. 2 is a perspective view of a first battery pack including multiple cell module assemblies of FIG. 1.
Figure 3:
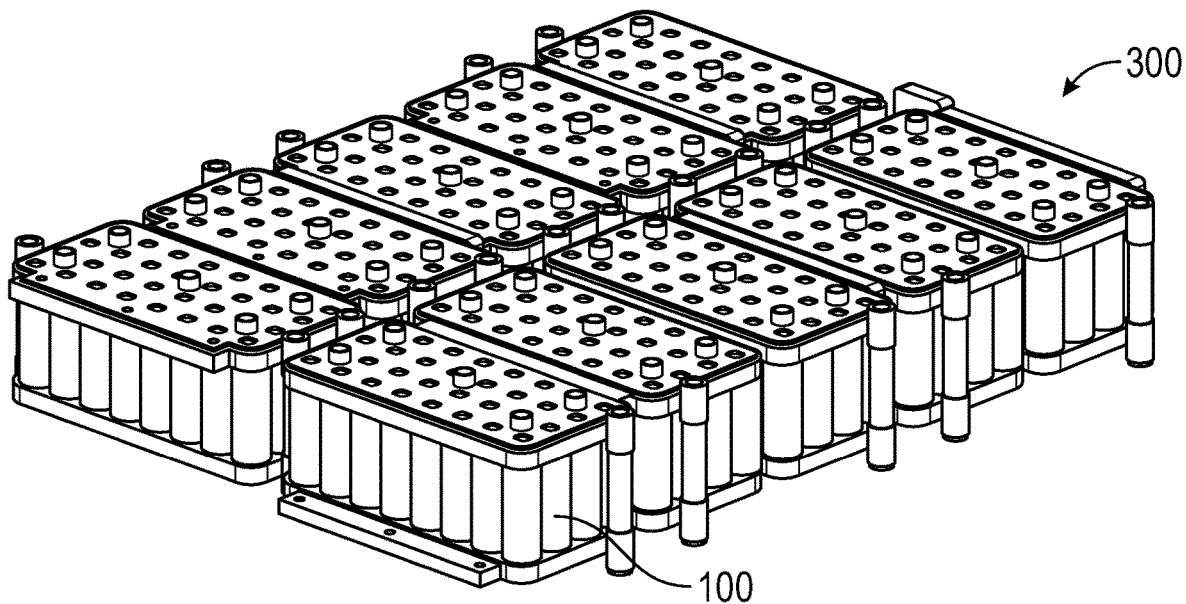
FIG. 3 is a perspective view of a second battery pack including multiple cell module assemblies of FIG. 1 assembled in another arrangement.
Figure 4:
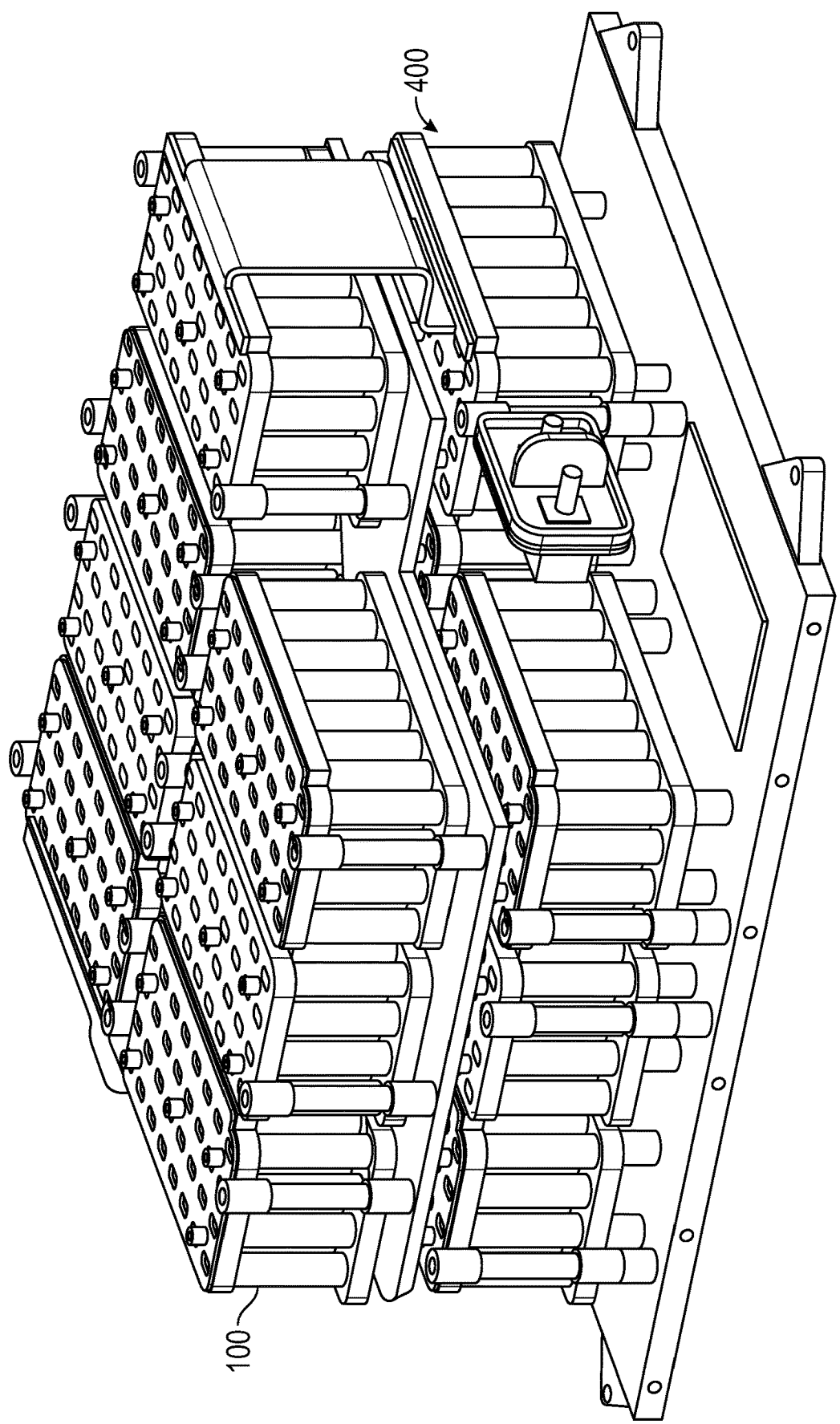
FIG. 4 is a perspective view of a third battery pack including multiple cell module assemblies of FIG. 1 assembled in another arrangement.

Referring to FIGS. 2-4, multiple CMAs 100 are combined with each other to form a battery pack suitable for a particular end use. The battery packs accommodate different end uses based on the number of CMAs 100 used, how the CMAs 100 are connected to each other, and the available physical space (e.g., volume or footprint) for the battery pack. For example, the battery pack 200 is rated at 48 volts and 7.2 kilowatt-hours, the battery pack 300 is rated at 36 volts and 3.7 kilowatt-hours, and the battery pack 400 is rated at 48 volts and 5.1 kilowatt hours. The CMA 100 can serve as a single unit "building block" for assembling battery packs with different ratings and different sizes for use in particular applications. This flexibility allows a battery pack to be customized for its particular application while using the same CMA 100 building block across multiple battery pack applications. The battery pack 200 includes two layers of CMAs 100 and is relatively long with the bottom layer consisting of two rows of eight CMAs 100 and the top layer consisting of two rows of six CMAs 100. The battery pack 400 also includes two layers of CMAs but has a shorter length than the battery pack 200 by being arranged in two identical layers consisting of one row of four CMAs 100 next to a second row of three CMAs 100. The battery pack 300 is a flat (i.e., single-level) arrangement with a single layer consisting of two rows of five CMAs 100. Each battery pack 200, 300, 400 may be identified with an individual identifier (e.g., serial number, bar code, etc.) for use by the CMA manufacturer to track, categorize, evaluate, or record information or data about an individual battery pack 200, 300, 400 and the particular CMAs 100 used in that battery pack 200, 300, 400.

Figure 5:
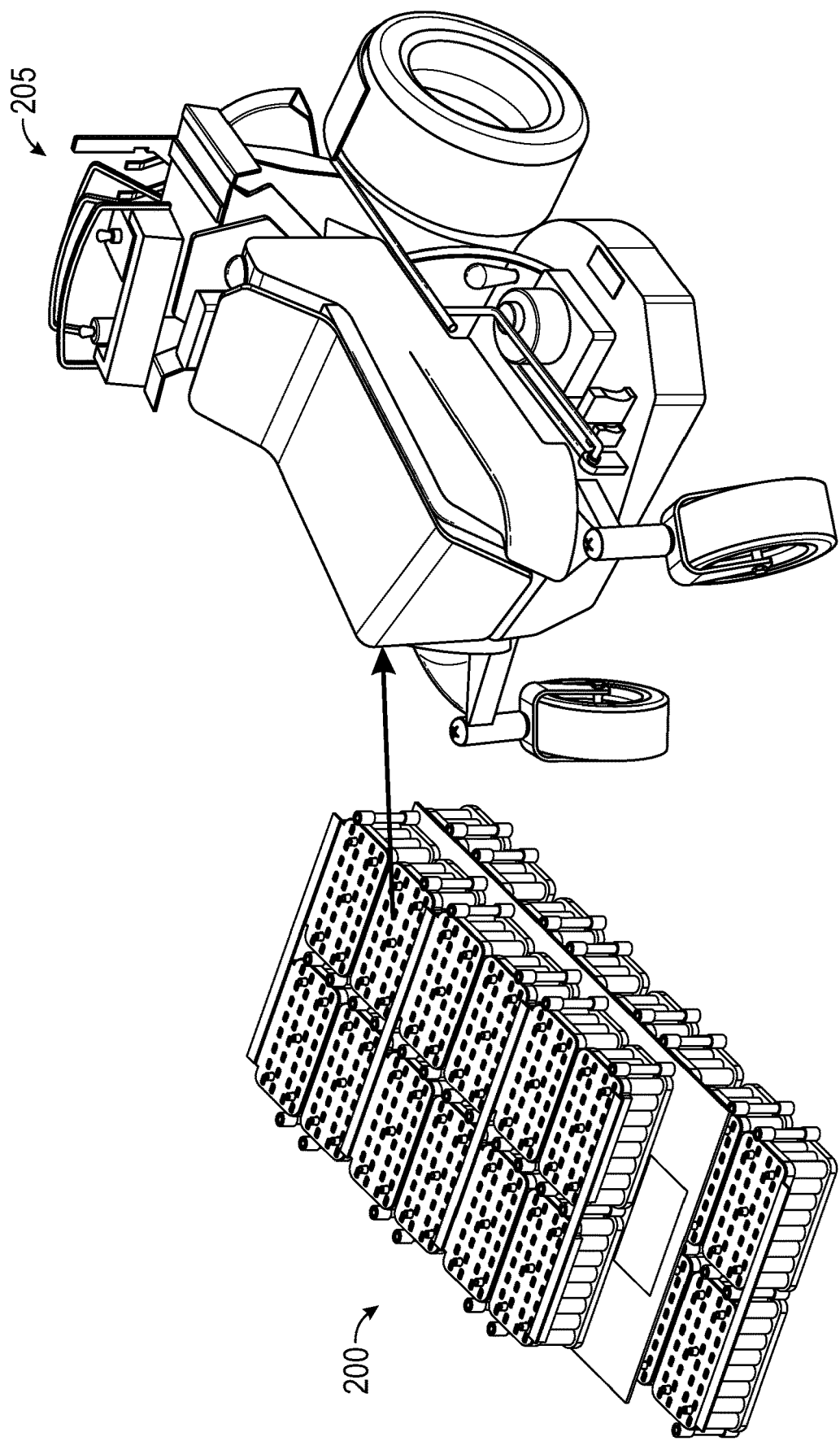
FIG. 5 is a perspective view of the battery pack of FIG. 2 and a lawn mower capable of using the battery pack of FIG. 2.
Figure 6:
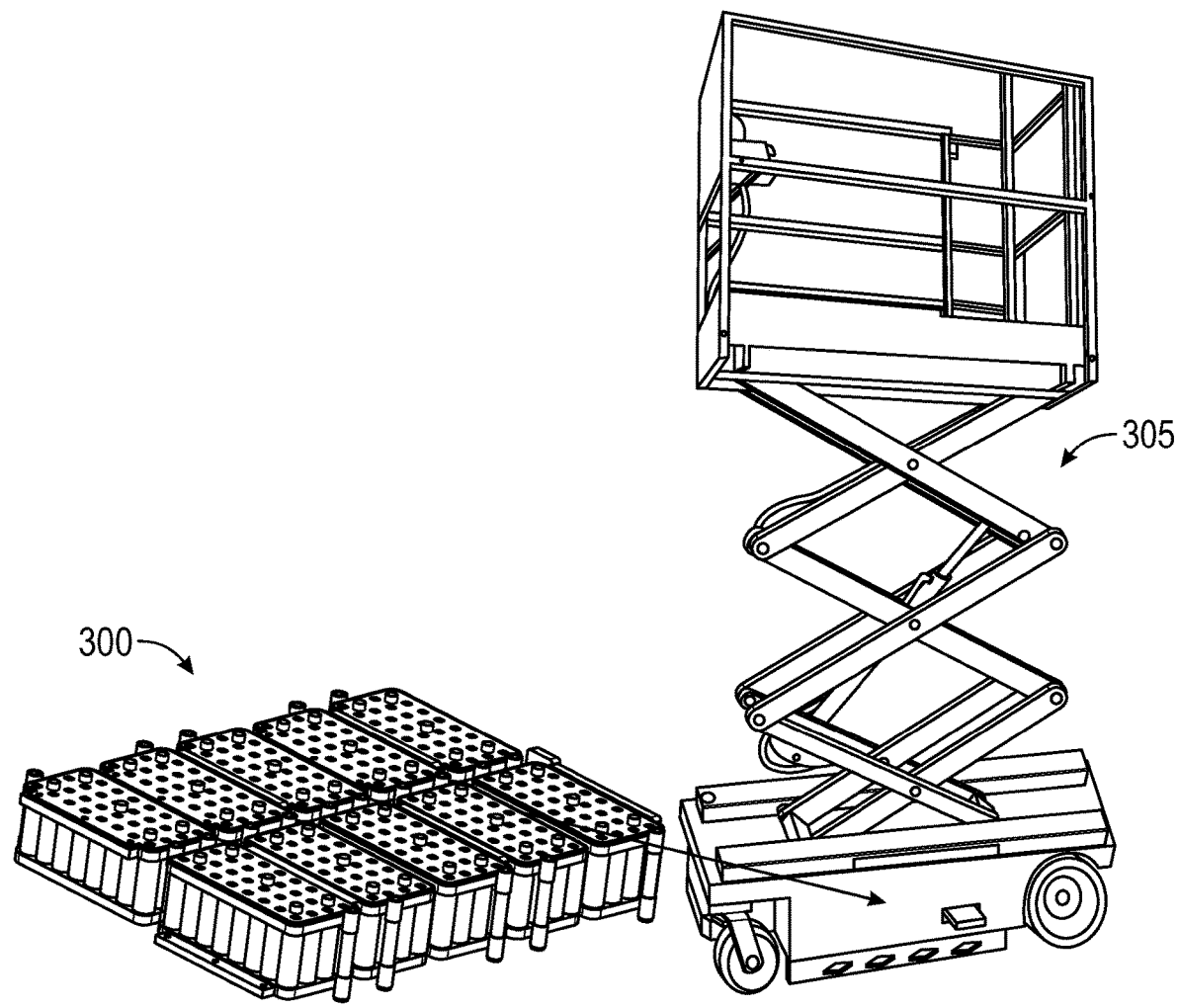
FIG. 6 is a perspective view of the battery pack of FIG. 3 and an aerial man-lift capable of using the battery pack of FIG. 3.
Figure 7:
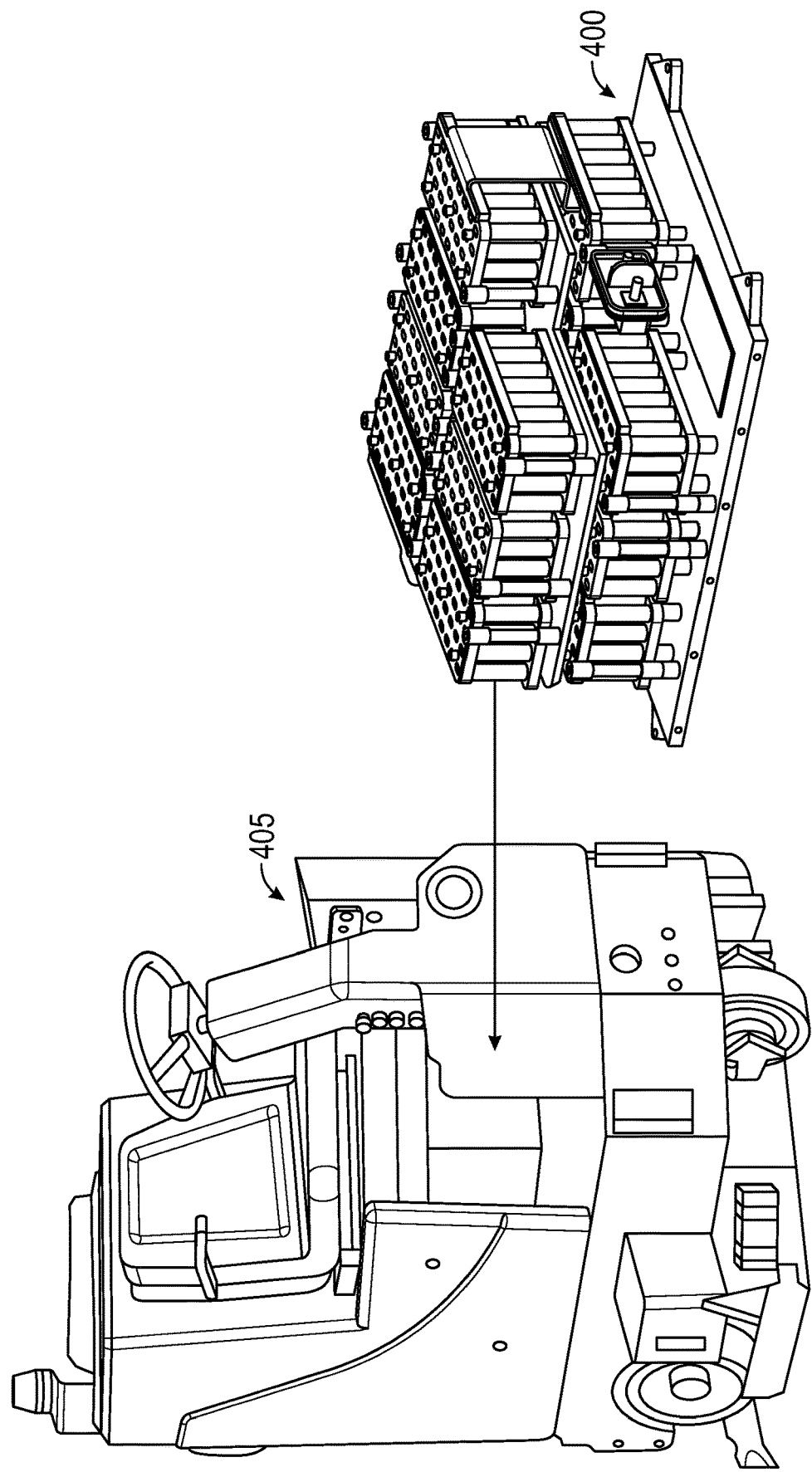
FIG. 7 is a perspective view of the battery pack of FIG. 4 and a floor cleaner capable of using the battery pack of FIG. 4.
Figure 8:
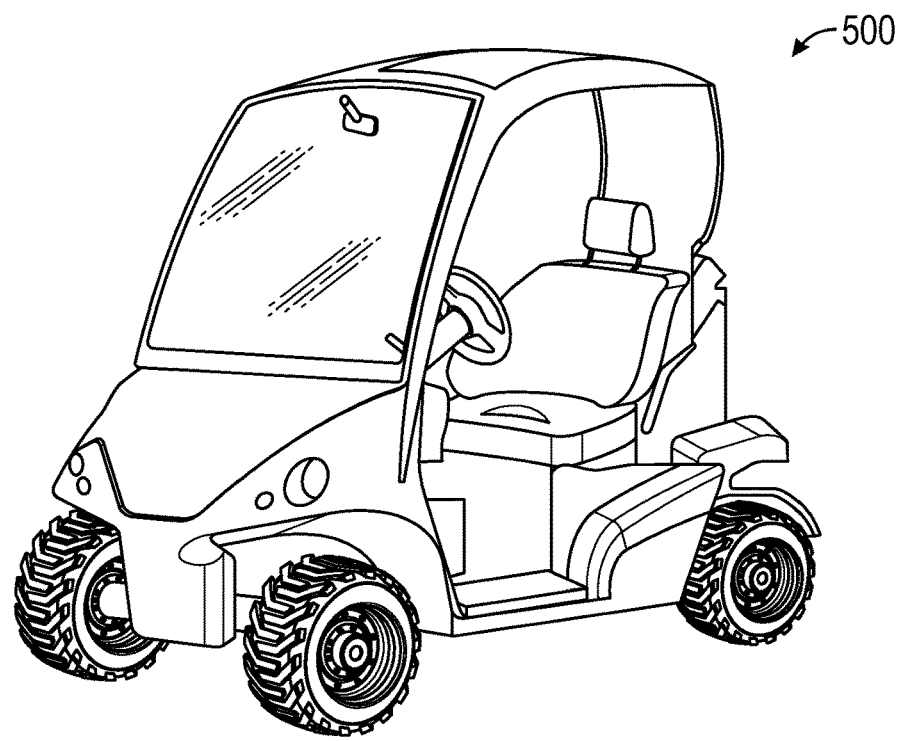
FIG. 8 is a perspective view of a golf cart, according to an exemplary embodiment.
Figure 9:
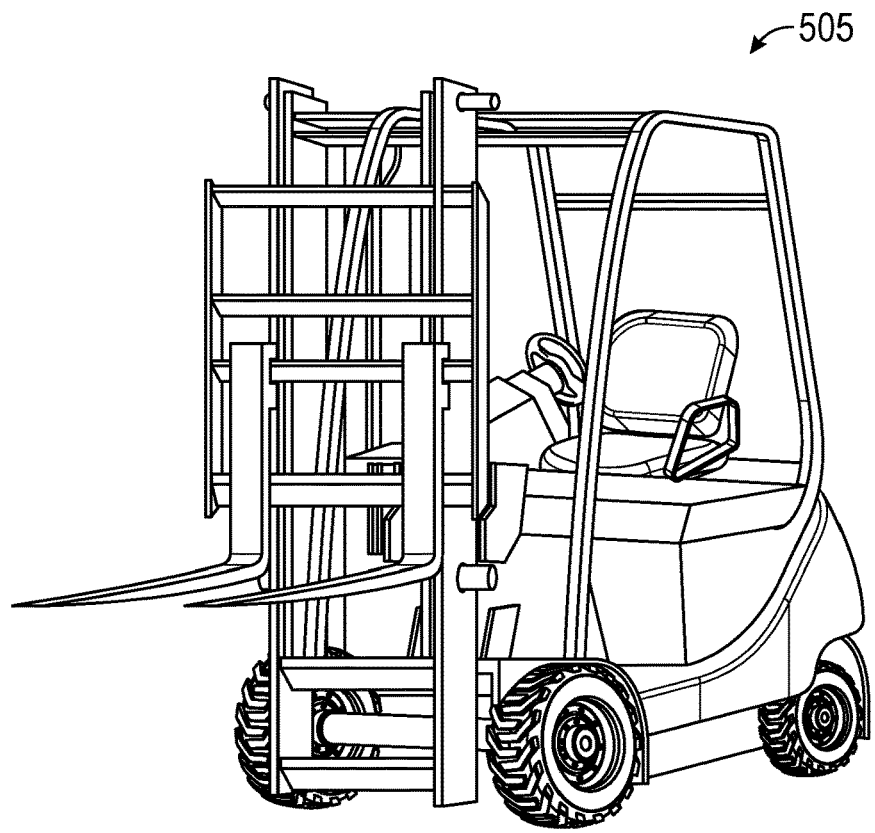
FIG. 9 is a perspective view of a lift truck, according to an exemplary embodiment.
Figure 10:
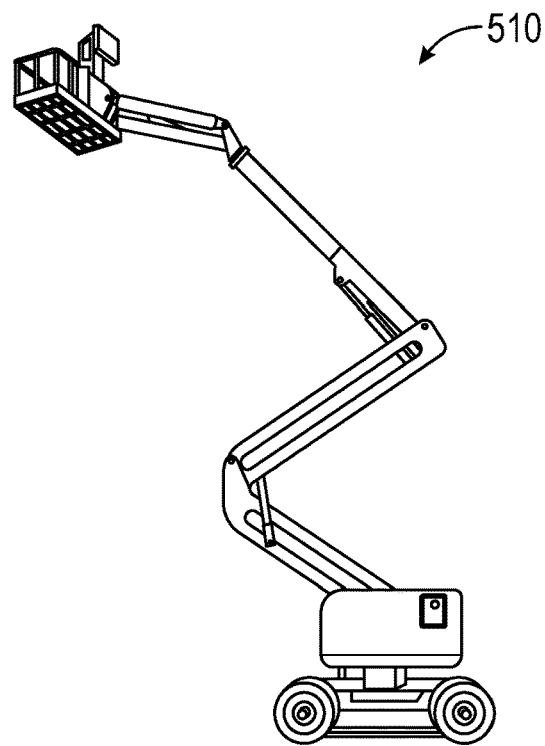
FIG. 10 is a perspective view of an aerial man lift, according to an exemplary embodiment.
Figure 11:
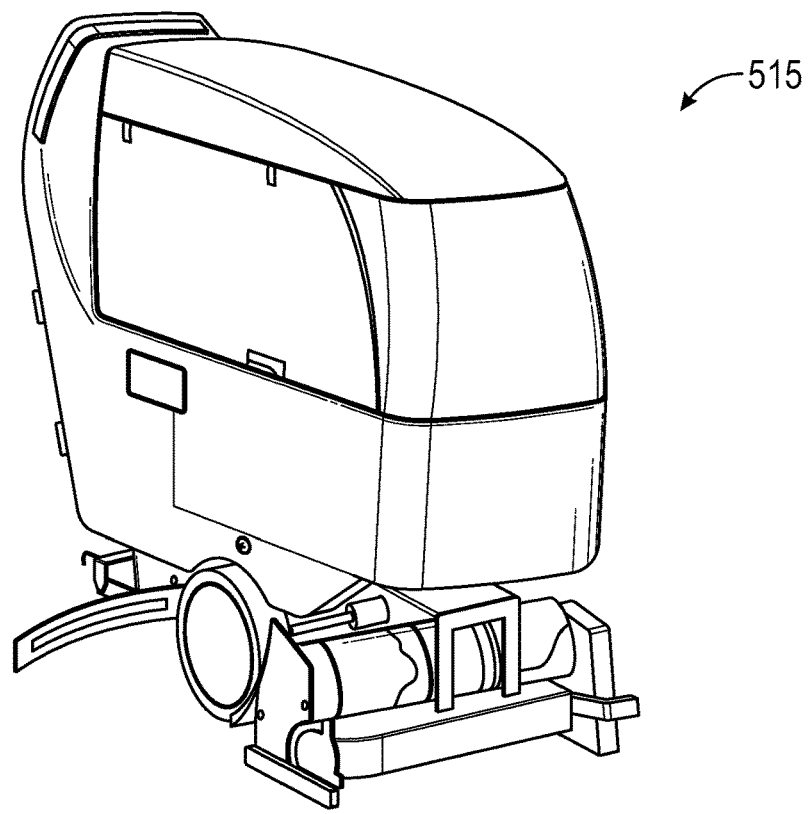
FIG. 11 is a perspective view of a floor care device, according to an exemplary embodiment.
Figure 12:
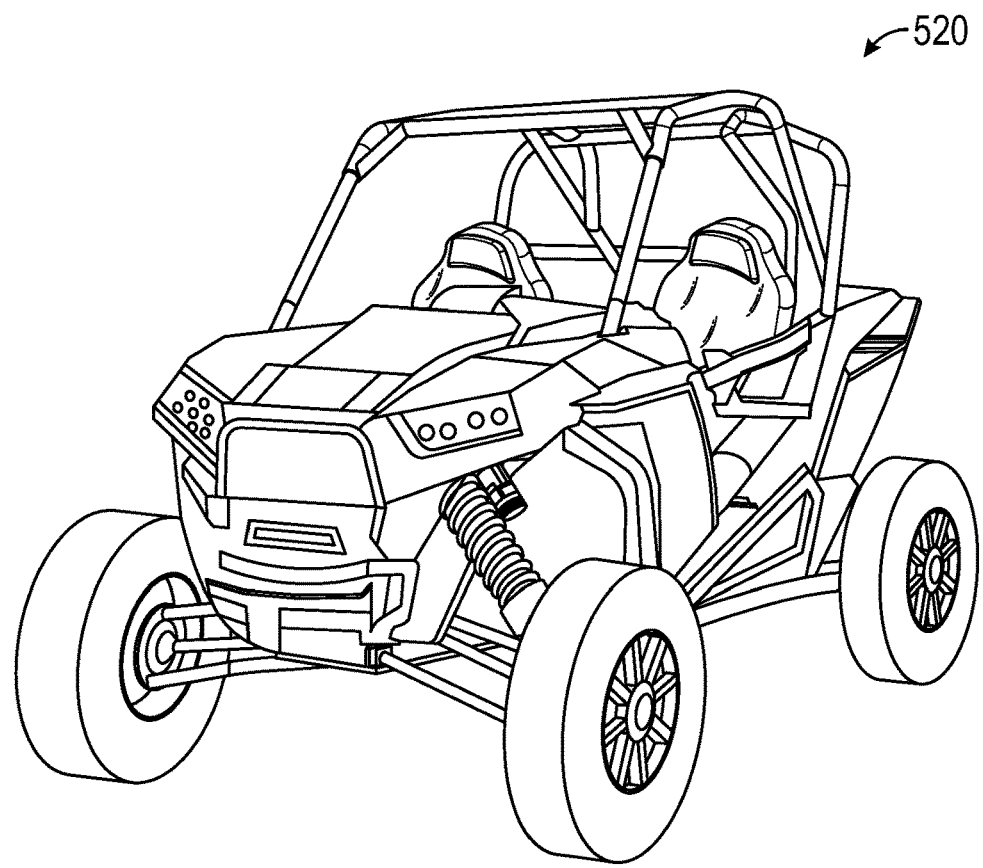
FIG. 12 is a perspective view of a recreational utility vehicle, according to an exemplary embodiment.
Figure 13:
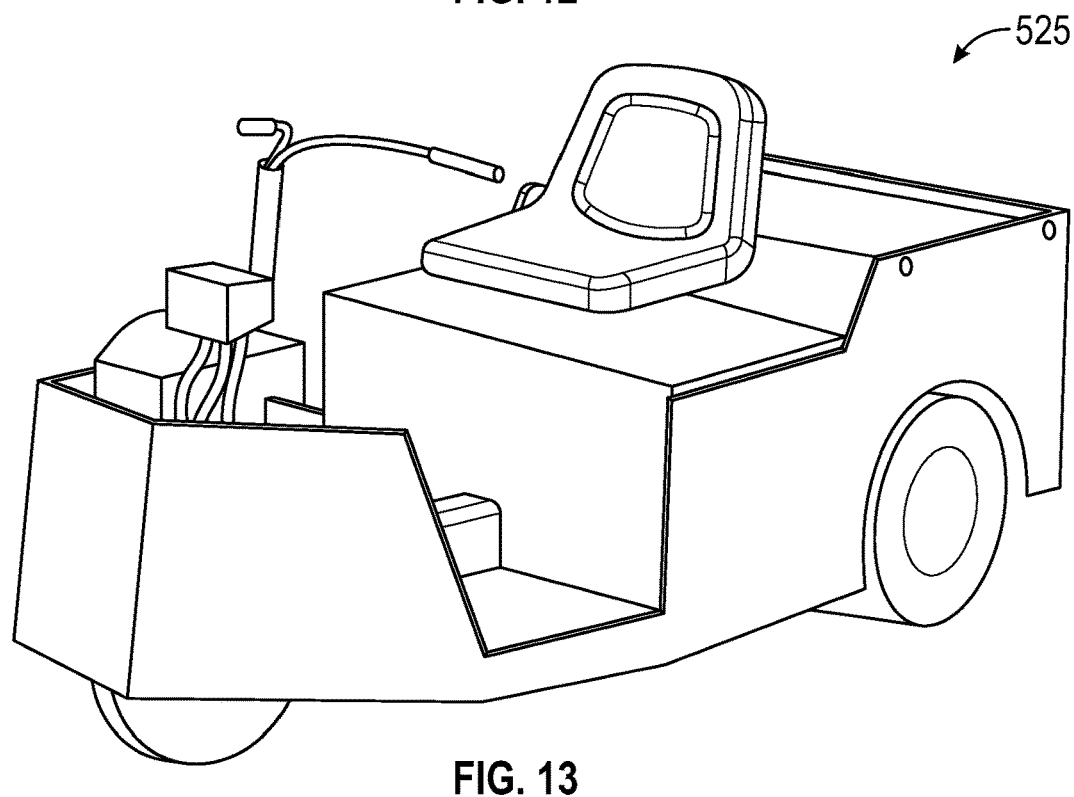
FIG. 13 is a perspective view of an industrial utility vehicle, according to an exemplary embodiment.

As depicted in FIGS. 5-7, different battery packs 200, 300, 400 are suitable to power different equipment. The use of CMAs 100 allows a battery pack 200, 300, 400 to be customized for use with a particular piece of equipment. The battery pack 200 could be adapted for use in a lawn mower 205, such as a commercial zero-turn lawn mower. The battery pack 300 could be used in a scissors-style aerial man lift 305, or other industrial lift equipment or aerial work platforms. The battery pack 400 could be used in a floor cleaner or scrubber 405. These or other battery packs 200, 300, 400 formed of CMAs 100 can be used in other equipment as illustrated in FIGS. 8-13, including golf carts 500, lift trucks 505, aerial man lifts 510, floor care devices 515, recreational utility vehicles 520, and industrial utility vehicles 525. These or other battery packs formed of CMAs 100 can also be used in other lawn and garden equipment, automobiles, motorcycles, and energy storage or battery backup systems.

The maximum charge capacity of the cells 105 of the CMAs 100 in a battery pack decays as the battery pack ages. This decay is caused by cyclically discharging and then recharging the battery pack, changes in temperature (e.g., high temperatures), and degradation of the chemistry of the battery cells over time. A cycle is the transition from the battery pack's fully charged state (as allowed by the BMS) to its fully discharged state (as allowed by the BMS). As the number of cycles increases over the life of the battery pack, the battery pack's maximum charge capacity declines.

For example, the initial charge capacity of a battery pack, which is identified as 100% charge capacity, may degrade to about 70% charge capacity after two thousand cycles. This reduction in charge capacity results in a corresponding reduction in the battery pack's energy rating. For example, a battery pack that was initially rated at 7.2 kilowatt-hours would be reduced to 5.04 kilowatt-hours when the battery pack is degraded to 70% charge capacity. For the battery pack 200, which is suitable for use in a commercial lawn mower (e.g., the zero-turn lawn mower 205 of FIG. 5), reduction in the battery pack 200's energy rating means less energy available to operate the mower and fewer jobs completed with the mower on a single charge of the battery pack 200. If a day's operation of the commercial lawn mower 205 is considered to be one cycle of the battery pack 200 (even though each day may not result in the battery pack 200 transitioning from the fully charged state to the fully discharged state) and the commercial lawn mower 205 is used in a temperate environment where lawn mowing services are required year round, then the battery pack 200 would not be reduced to 70% charge capacity until almost five and one half years of operation (i.e., 2000 cycles divided by 365 days in a year). However, the practical life span of the commercial lawn mower 205 itself is less than this, about three and one half to four years, resulting in a battery pack 200 with useful life remaining when the equipment it was powering (i.e., the commercial lawn mower 205) has reached the end of its life.

This presents an opportunity to reuse the CMAs 100 used to power equipment that has reached the end of its life for use to power different equipment. For example, if 70% charge capacity is considered the end of a first life for the battery pack 200 where it is no longer suitable for use to power a commercial lawn mower, the battery pack 200 still is capable of producing about 5 kilowatt-hours and the CMAs making up the battery pack 200 can be reconditioned and put to use with equipment with lower energy demands than a commercial lawn mower (e.g., an aerial man lift, an industrial utility vehicle, a home energy storage system, etc.).

The electronic controller 140 of each CMA 100 is programmed to store and use data related to the operation of that CMA 100 to determine a useful life measurement for that CMA 100. The useful life measurement may be expressed in terms of a percentage of life. For example, the useful life of the CMA 100 is at 100% life when the CMA 100 is brand new. The useful life measurement may be used to set multiple end of life thresholds tied to certain applications for the CMA 100. In the example above for the battery pack 200, a CMA's 100 first life would extend between 100% and 70% charge capacity and the battery pack 200 would be suitable for use powering a commercial lawn mower while its CMAs 100 are within that first life band. After the end of the first life (e.g., a useful life measurement below 70% is observed), the CMA 100 could be reconditioned and put to use in its second life (e.g., between 70% and 50%) in which the CMA 100 is suitable for use in a battery pack for equipment having lower energy requirements than the equipment powered by the CMA 100 during its first life.

The useful life measurement can be determined by a number of data points indicative of useful life that can be monitored and saved by the electronic controller 140. These useful life indicators include charge capacity, days or other time elapsed since a commissioning date when the CMA 100 is first put into service, number of cycles since the commissioning date, depth of cycle for individual cycles or groups of cycles, an electrical charge tracker that counts the number of coulombs supplied by the CMA 100 since the commission date, an event counter of operation of the CMA 100 in extreme temperature conditions (e.g., above 140 degrees Fahrenheit) for individual events or groups of events, the current supplied by the CMA 100, the current received by the CMA 100 for charging, the voltage supplied by the CMA 100, and/or the voltage applied to the CMA 100 during charging. In different embodiments, different combinations of useful life indicators are monitored and saved by the electronic controller 140. The useful life indicators identified above may be monitored individually in some embodiments or monitored in any combination in other embodiments. In other embodiments, useful life indicators are tracked and stored for each individual battery cell 105 of the CMA 100.

Gathering and tracking useful life indicators across the life of the CMA rather than a single instantaneous reading indicative of the end of life (e.g., 70% charging capacity) provides additional information to classify a CMA 100 for reconditioning to an appropriate use. In some embodiments, not every data point associated with a useful life indicator is stored. For example, temperature may be sampled and stored on a weekly basis rather than a daily basis. CMAs 100 may be classified where different classifications are suitable for use in different second lives or based on different expected future performance in the second life as determined by the evaluation of the useful life indicators from the first life. Tracking useful life indicators also provides the CMA manufacturer with data that can be used for diagnostics to determine why a particular CMA 100 performs better or worse than a similar CMA 100 and then use that diagnostic information to improve manufacturing or other processes for new CMAs 100.

For example, a CMA 100 with 70% charging capacity, but a relatively high number of days operated in extreme temperature conditions may have its charging capacity degrade at a faster rate than a CMA 100 with a 70% charging capacity and no days operated in extreme temperature conditions. Both CMAs 100 may be suitable for reconditioning and use in their second lives, but the appropriate uses for the two CMAs in their second lives may be different based on their classification resulting from evaluation of their respective useful indicators. Tracking and storage of useful life indicators can also be used to evaluate returned or warrantied battery packs, fix or refurbish battery packs returned within their first life, and improve manufacturing processes by comparing various CMAs 100 to one another.

The useful life indicators are used to identify when a CMA 100 has reached an end of life threshold. The CMA 100 may have multiple end of life thresholds. For example, the CMA 100 may be suitable for use in a first application during the span of its first life (e.g., a commercial lawn mower). When the CMA 100 reaches its first end of life threshold (e.g., 80%, 75%, 70%, etc. of its useful life), the CMA 100 is taken out of service for the first application and returned to the CMA manufacturer. The CMA manufacture then categorizes or classifies the CMA 100 based on its useful life data to identify a suitable second life application for that particular CMA 100. If necessary, that CMA 100 is reconditioned or refurbished and then combined with other similarly classified CMAs 100 to form a battery pack for use in a second life application. This new battery pack can be used in the second life application until the CMA reaches a second end of life threshold (e.g., 50%, 45%, 40%, etc. of its useful life). This method of using the same CMA 100 for different applications based on the CMA's 100 life cycle allows the CMA manufacturer to make more complete use of the CMA's 100 available capacity by using the CMA 100 in multiple applications rather than having a CMA 100 at the end of its first life discarded and not make use of the remaining battery capacity.

The CMA manufacturer may lease battery packs consisting of multiple CMAs 100 to the user of the equipment powered by the battery pack. This approach would enable the user of the CMA during its first life to return the battery pack at the end of its first life to the CMA manufacturer, allowing the CMA manufacturer to classify the CMAs 100 and reuse them for second life applications, where the resulting battery packs could again be leased or sold to the user of the equipment powered by the battery pack consisting of CMAS in their second life. Alternatively, the CMA manufacture can sell the battery packs consisting of CMAs 100 and buy back the battery packs at the end of the first life of the CMAs 100 for classification and reuse in a second life application.

Referring to FIG. 2, in some embodiments, an electronic controller 142 is provided for the entire battery pack 200, not for a single CMA 100 as described with respect to FIG. 1. The battery pack electronic controller 142 performs the same functions described herein for the CMA electronic controller 140 on a battery pack-wide basis rather than on a CMA-wide basis. The useful life indicators and other categorization and data storage functions described herein are performed by the electronic controller 142 and are associated with each of the CMAs 100 that make up the specific battery pack.

Figure 14:
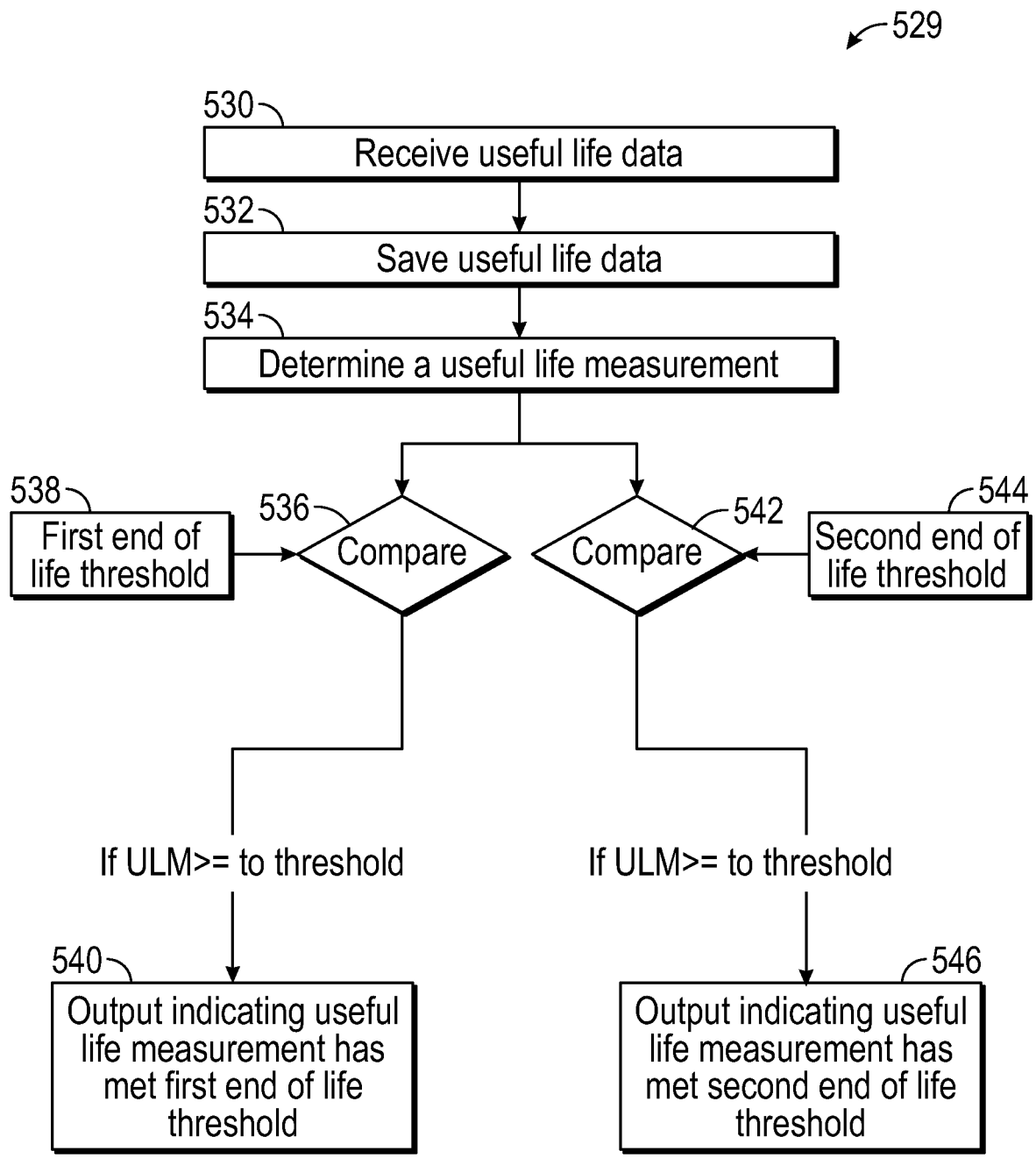
FIG. 14 is a process diagram depicting a method of evaluating a cell module assembly, according to an exemplary embodiment.

Referring to FIG. 14, a method of evaluating a CMA 529 is illustrated according to an exemplary embodiment. In step 530, an electronic controller (e.g., electronic controller 140 or electronic controller 142) receives useful life data. In step 532, the useful life data is saved (e.g., to a memory of the electronic controller 140, 142). In step 534, a useful life measurement is determined from the useful life data (e.g., as described above). In step 536, the useful life measurement is compared to a first end of life threshold (item 538) and if the useful life measurement is greater than or equal to the first end of life threshold, an output (item 540) indicating the useful life measurement has met the first end of life threshold is generated (e.g., by the electronic controller 140, 142). The CMA 100 that has been determined to be at or past the first end of life threshold may be removed from service (e.g., by removing the battery pack it is part of from service) and then categorized for use in a suitable second life application. In step 542, the useful life measurement is compared to a second end of life threshold (item 544) and if the useful life measurement is greater than or equal to the second end of life threshold, an output (item 546) indicating the useful life measurement has met the second end of life threshold is generated (e.g., by the electronic controller 140, 142). In some embodiments, step 542 is only performed on a CMA 100 in use for its second life or on a battery pack including one or more CMAs 100 in use for their second life. The CMA 100 that has been determined to be at or past the second end of life threshold may be removed from service (e.g., by removing the battery pack it is part of form service) and then disposed of or categorized for use in a suitable third life application.

Figure 15:
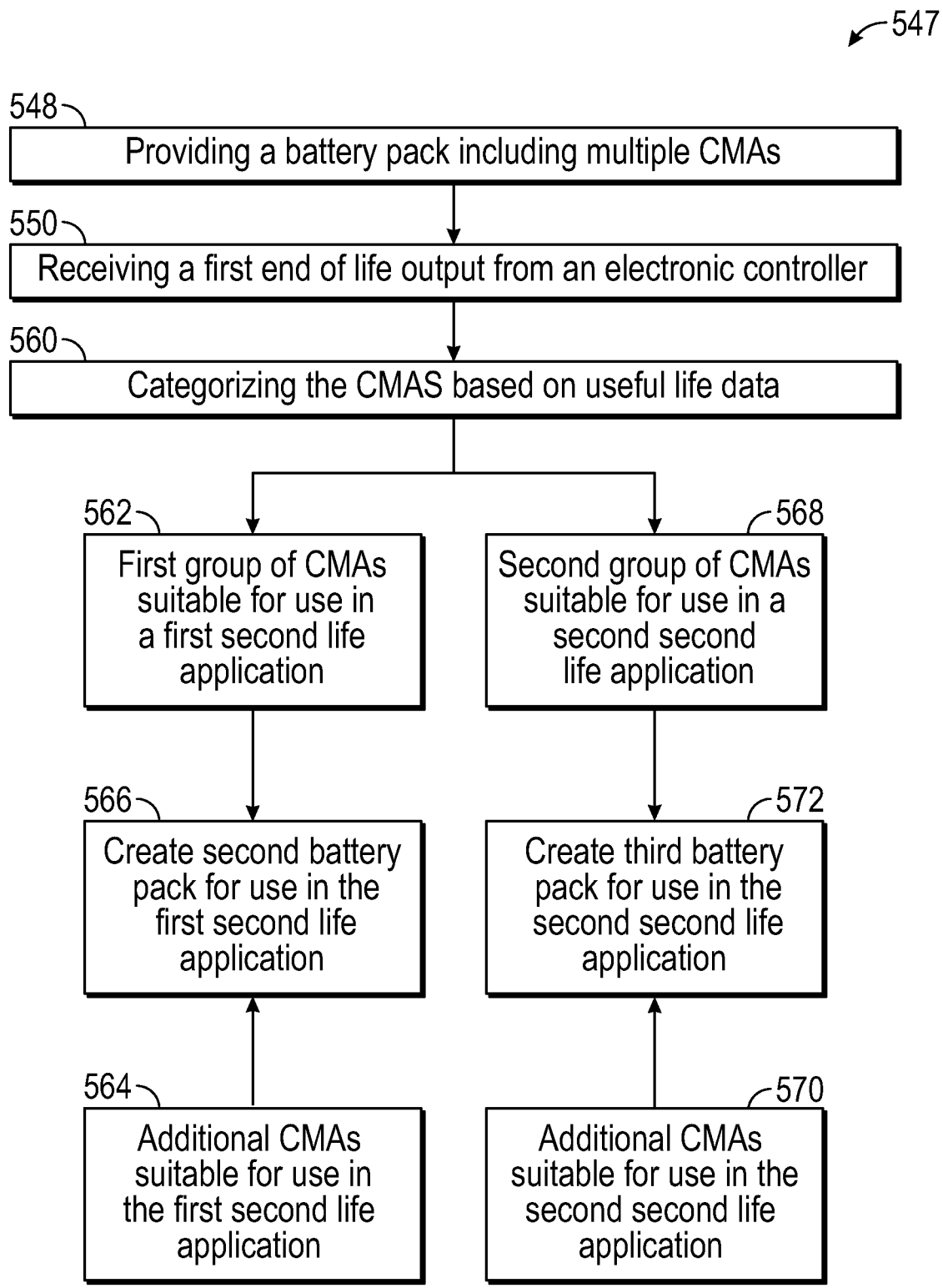
FIG. 15 is a process diagram depicting a method of reusing a component of a battery pack, according to an exemplary embodiment.
Figure 16:
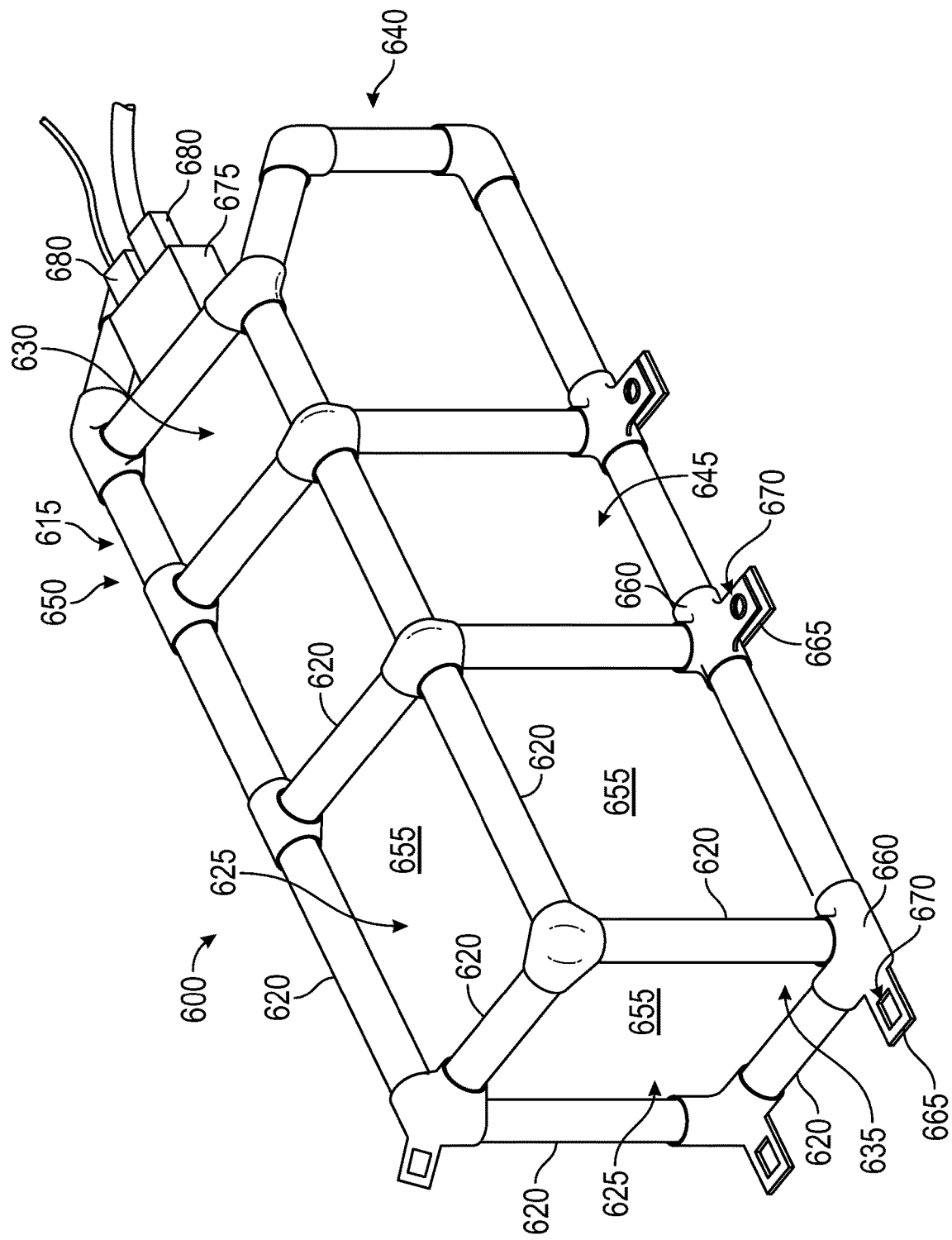
FIG. 16 is a perspective view of a housing for use with a battery pack, according to an exemplary embodiment.

Referring to FIG. 15, a method of reusing a component (e.g., a CMA) of a battery pack 547 is illustrated according to an exemplary embodiment. In step 548, a battery pack including multiple CMAs 100 is provided (e.g., by a CMA manufacturer). The CMA manufacturer will provide multiple such battery packs, but the method is described with reference to a single battery pack for exemplary purposes. In step 550, a first end of life output is received from an electronic controller (e.g., according to the method 539 described above, using electronic controller 140, 142). The battery pack is removed from service (e.g., by the CMA manufacturer or by the battery pack customer returning the battery pack to the CMA manufacturer). The CMAs 100 are evaluated and categorized based on useful life data for use in a suitable second life application in step 560. This identifies one or more CMAs 100 suitable for use in a first second life application (item 562). This group of CMAs 100 is combined with additional CMAs 100 suitable for use in the first second life application (item 564) to create a second battery pack for use in the first second life application (step 566). Step 560 may also identify one or more CMAs 100 suitable for use in a second second life application (item 568). This group of CMAs 100 is combined with additional CMAs 100 suitable for use in the second second life application (item 570) to create a second battery pack for use in the first second life application (step 572). In some embodiments, all CMAs 100 from the same battery pack may be categorized for use in the same second life application. For example, this may occur in battery packs that use a battery pack electronic controller 142 that saves the same data for each CMA 100 used in that battery pack.

Referring to FIGS. 16-20, each battery pack may be protected by and positioned within a housing 600 that is customizable to accommodate the size of a particular battery pack. The housing 600 includes a bottom mounting plate 605 including projections or bosses 610. In some embodiments, the mounting plate 605 is formed from aluminum, which can facilitate heat rejection from the battery pack. A frame 615 formed of multiple support members or trusses 620 is attached to the mounting plate 605 at the bosses 610. In some embodiments, the trusses 620 are hollow tubes (e.g., round tubes or square tubes) that provide rigidity and support at a lower weight than a solid truss.

The frame 615 forms a lattice of adjacent sections 625 defined by at least three trusses 620. In different embodiments, the sections 625 can be triangles, rectangles, squares, other quadrilaterals, or polygons with more than four sides. In some embodiments, the trusses 620 of a section 625 are positioned not perpendicular to each other. At least one truss 620 is provided at angle relative to an adjacent truss that is not ninety degrees, thereby presenting an angled truss that is suitable for use as a hoisting point for lifting and maneuvering the housing 600 and the battery pack within. In some embodiments, the housing 600 and the battery pack it contains weigh about one hundred fifty pounds. Accordingly, the housing 600 can include dedicated hoisting locations defined by the angled trusses to help transport the housing 600.

Figure 17:
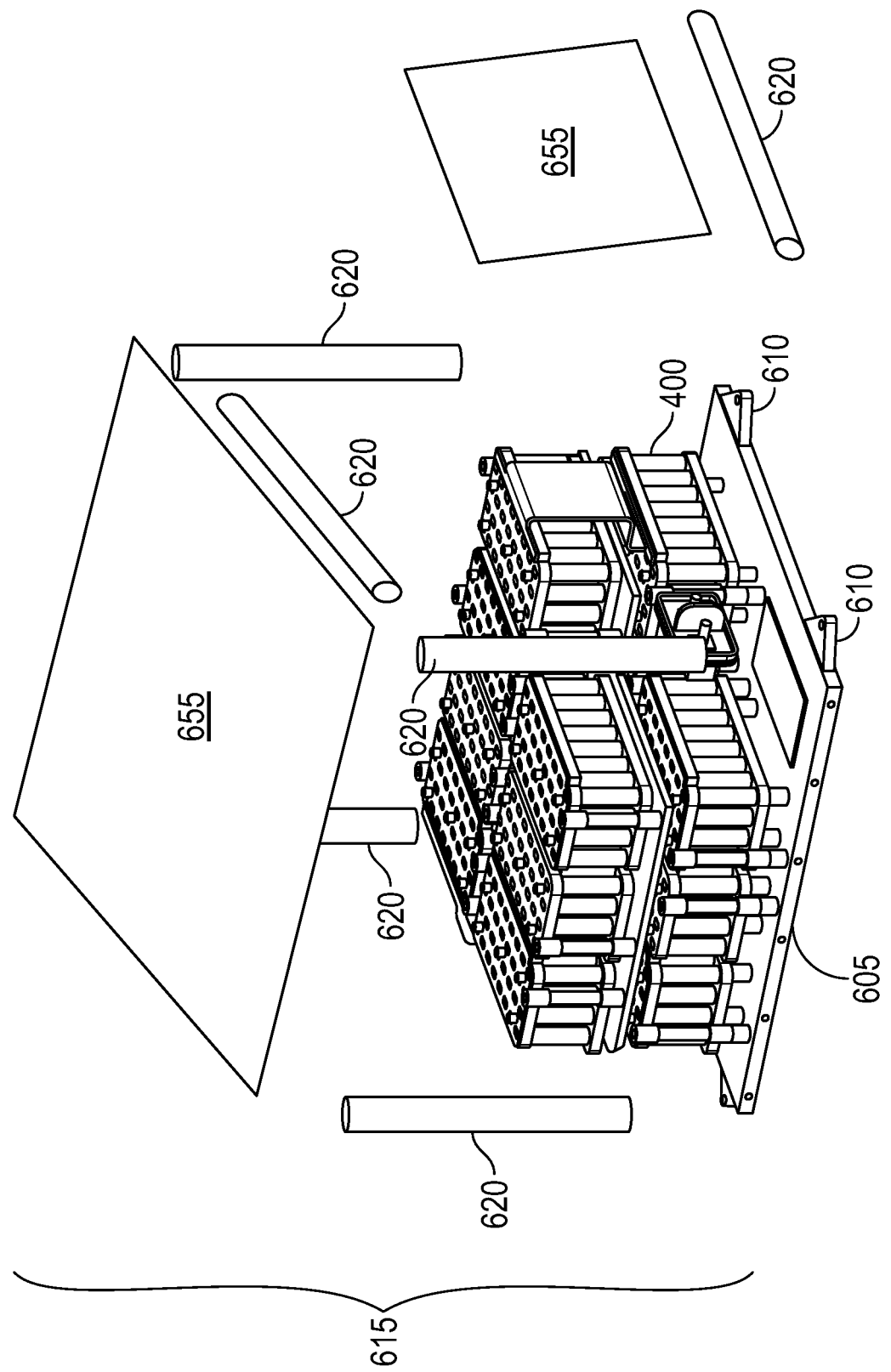
FIG. 17 is an exploded perspective view of a housing and a battery pack, according to an exemplary embodiment.

As illustrated, the frame 615 has top portion 630, a front portion 635, a rear portion 640, a left side portion 645, and a right side portion 650 so that the frame 615 in combination with the mounting plate 605 forms a rectangular housing 600 suitable for use with a rectangular or substantially rectangular battery pack, like the battery pack 400 illustrated in FIG. 17. The housing for different battery packs may take different shapes. For example, the housing for battery pack 200 may have a stepped profile that matches the stepped shape of the two layers of CMAs 100 that make up the battery pack 200.

The top portion 630 formed of sections 625 provides protection from crushing to the battery due to the trusses 620 arranged across the top portion 630 between the left side portion 645 and the right side portion 650. These trusses 620 act as cross members that would not be present if the top portion of the frame were a single large rectangle and not formed from multiple sections 625.

Figure 18:
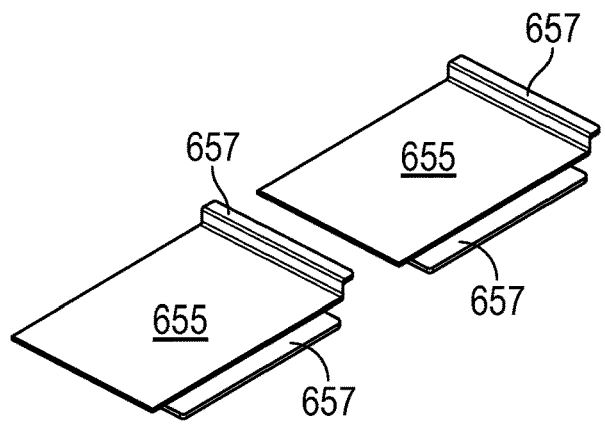
FIG. 18 is a perspective view of two panels of a housing, according to an exemplary embodiment.
Figure 19:
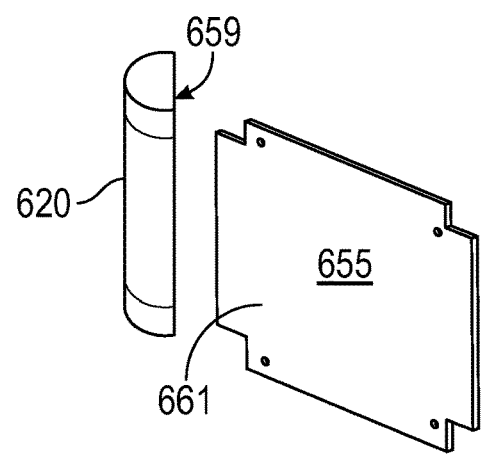
FIG. 19 is a perspective view of a truss and a panel, according to an exemplary embodiment.

Panels 655 are attached to each section 625 to close the opening of the section 625. The panels 655 protect the battery pack from moisture, debris, and other unwanted or unauthorized access to the battery pack. The panels 655 may be formed from a polymer or plastic (e.g., by thermoforming, blow molding, injection molding, etc.). As shown in FIG. 18, in some embodiments, each panel 655 has projections 657 that are used to form an overlap joint between adjacent panels 655 or between a panel 655 and a truss 620. The projection 657 overlaps an adjacent panel 655 or a truss 620 and can be secured to the panel 655 by a fastener, an adhesive, or other appropriate attachment mechanism. As shown in FIG. 19, in some embodiments, a truss 620 includes a slot or aperture 659 for receiving a portion 661 of a panel 655 to secure the panel 655 to the truss 620.

In some embodiments, the frame 615 includes connecting couplings or members 660 (e.g., corner couplings, tee couplings, etc.) that connect the trusses 620 to one another to form the frame 615. The connecting couplings 660 may include bosses or projections 665 including an opening 670 for securing the housing 600 to the mounting plate 605 (e.g., with bolts or other fasteners), securing the housing 600 in place on a piece of equipment, for attaching a device to hoist or move the housing 600 (e.g., a hook or strap), or other attachment purposes.

The housing 600 includes one or more electrical ports 675 to connect the battery pack to the equipment to be powered by the battery pack. The port(s) 675 allow connection of one or more cables 680 to the battery pack for the transfer of electricity to and from the battery pack. In some embodiments, data is also transferred to and from the battery pack via a port 675 and cable 680.

Figure 20:
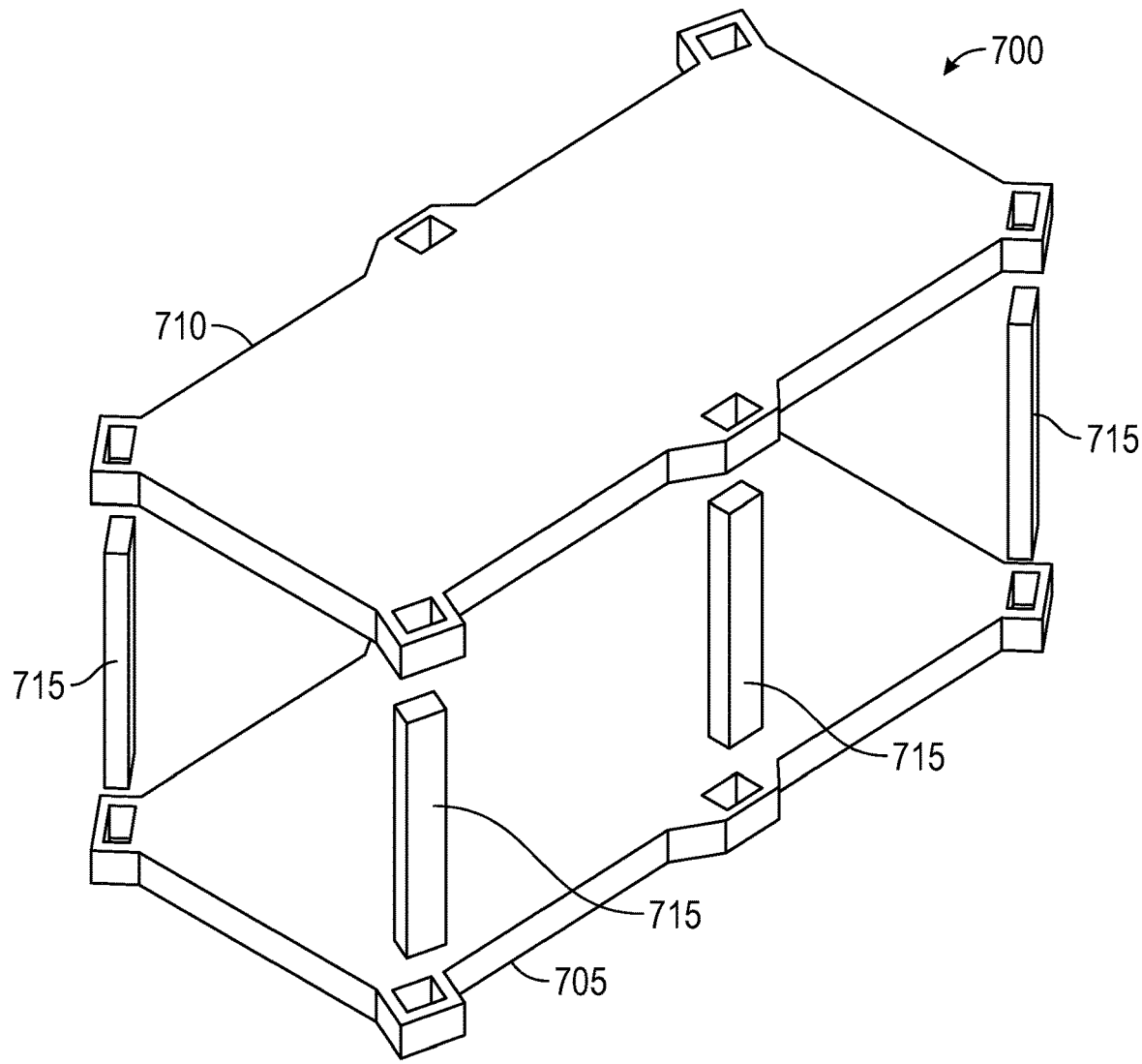
FIG. 20 is a perspective view of a housing for use with a battery pack, according to an exemplary embodiment.

As shown in FIG. 20, in alternative embodiments, a housing 700 is formed by two plates. The two plates include a bottom or mounting plate 705 and a top plate 710 with vertically arranged trusses 715 connecting the bottom plate 705 to the top plate 710. The openings between the trusses 715 may be closed panels in a manner similar to that described for the housing 600.

Figure 22:
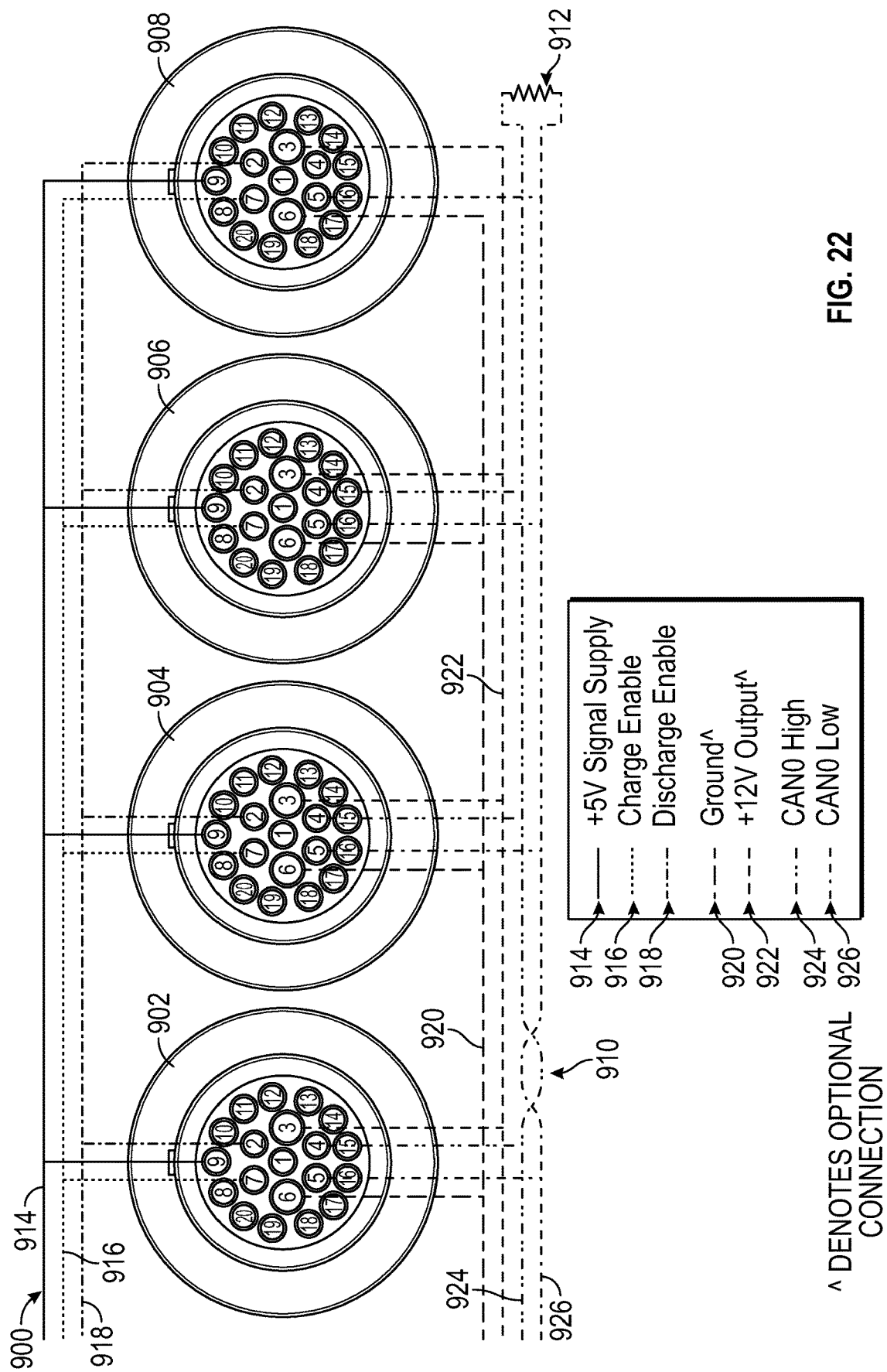
FIG. 22 is a schematic view of a paralleling diagram for communication connectors, according to an exemplary embodiment.
Figure 23:
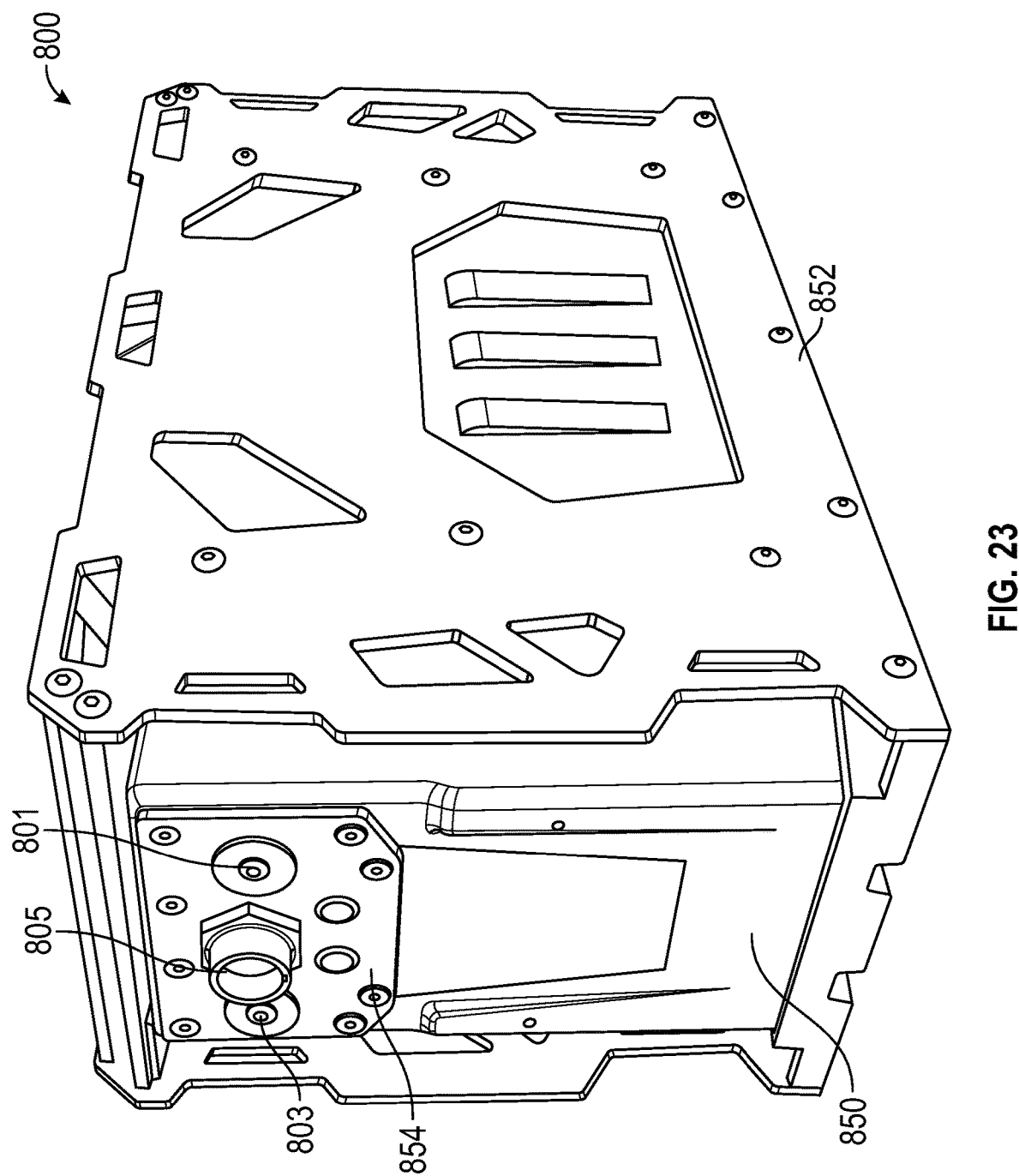
FIG. 23 is a perspective view of a battery pack incorporating the wire-entry side of FIG. 21.

Referring generally to FIGS. 21-23, a battery pack 800 that includes a primary voltage tap 801, 803 and a secondary voltage tap 805 is shown, according to an exemplary embodiment. The battery pack 800 generally includes one or more CMAs (e.g., CMAs 100) received within a battery housing 850. The battery housing 850 can be formed of a polymeric material, for example, that serves as an insulator. The battery housing 850 is supported by and received within a cradle 852. The cradle 852 can be formed of a series of plates that are bolted or otherwise coupled together. The cradle 852 can be used to help transport the battery pack 800 by providing a number of different lifting or leveraging points. For example, a series of slots can be formed within an upper surface of the cradle 852 to receive straps or forks that can help to move the battery pack 800 with material handling equipment. In some examples, the cradle 852 is configured to stack with additional battery packs 800 above or below the battery pack 800. As depicted in FIG. 23, the cradle 852 suspends the housing 850 and CMAs 100 received within the housing 850 off of the ground below, which can help to avoid water or contaminant damage that might otherwise occur.

In some embodiments, there are two different power outputs on the battery pack 800. For example, one of the power outputs is a 48V "primary" power output, or the "working" voltage tap, and is the mean terminal voltage of the battery (e.g., of battery pack 800). The secondary power output is a 12V power output for accessories of the application (e.g., a machine) and/or communication systems. The 48V primary power output includes a positive terminal 801 and a negative, or "ground" terminal 803. The primary power output 801, 803 may be a voltage tap at a different location than the voltage tap for the 12V secondary power output. In some examples, a connector plate 854 coupled to the housing 850 supports the primary power output and the secondary power output. For example, the positive terminal 801 and negative terminal 803 can be positioned on opposite sides of a secondary power output connector 805, spaced apart from one another on the connector plate 854. The secondary power output connector 805 can include a cylindrical boss that extends around and surrounds the communication connector pinout for the battery pack 800.

The 12V secondary power output signal may be turned on with digital Input/Output (I/O). The digital I/O may be input or output to a user operating outdoor power equipment (e.g., an industrial utility vehicle as described with reference to FIG. 13). The secondary power output may be used to indicate other pack voltage being "turned on" within outdoor power equipment. Furthermore, the digital I/O can be used to change to secondary power and the secondary power output may be used to indicate whether other functionalities of the battery pack 800 are operating properly. For example, the digital I/O may include electro-mechanical relays, power switches, accessories, turn-on display, lights, horns, indicators, sensors, etc., for outdoor power equipment that the secondary power output may indicate is not functioning correctly (e.g., headlights are not turning on during start up). In some embodiments, the secondary power output may be from a socket 806 as described with reference to FIG. 21 and table 801. The 12V secondary power output may be used for relays outside the battery system, such as the battery system shown in the paralleling diagram 900 depicted in FIG. 22. The 12V secondary power output may be passed through the panels (e.g., panels 655) of a battery pack that includes several cell module assemblies 100 inside the housing of the battery pack.

Referring now to FIG. 21, the wire-entry side of a battery 800 is shown, according to an exemplary embodiment. The wire-entry side view depicts the communication connector pinout for the battery 800. The battery 800 in FIG. 21 corresponds with the table 801. The table 801 lists the various sockets and their potential purposes within battery 800. For example, the table 801 lists the function of what communications are received at the sockets in the battery 800. The socket 802 may function as an emergency stop (i.e., an e-stop) request input. This may be a request from a user to stop outdoor power equipment (e.g., a lawn mower) during an emergency. The socket 804 may function as a discharge enable input. The discharge enable input may allow a battery to 'turn on' and begin providing power to the machine of outdoor power equipment. The socket 806 may operate as a positive 12 V Voltage output. In a normal situation, each battery pack in a battery system is connected to a 29-bit Controller Area Network bus (CANbus) network for sending and receiving communications from other battery packs. The CANbus network may have one wire for a CANbus high and one wire for CANbus low. A CAN0 High signal may occur when the CANbus high wire is transmitting a 0 for data. A CAN0 Low signal may occur when the CANbus low wire is transmitting a 0 for data. The socket 808 may function to send or receive a CAN0 High signal. The socket 810 may be operated to send or receive a CAN0 Low input.

The socket 812 may function as the input for ground to guarantee the battery 800 is grounded and not at risk for damage to the health of the battery and/or battery system (e.g., if battery 800 is connected in parallel to other batteries within a battery pack). The socket 814 may be a charge enable input. The socket 816 may function as an alarm output. The socket 818 may be a positive 5V signal supply. The socket 820 may function as a fault output. For example, the socket 820 may send a fault output for an outdoor power equipment when there is a problem within the battery pack 800. The socket 822 may be operated as a reserve socket that has no existing connection currently. The socket 824 may function as a 12V always-on enable output. The socket 826 may function as another socket that is currently reserved and has no existing connection. Socket 828 may function as an optional signal ground connection in addition to the socket 812 for ground. The socket 830 may operate as a CAN1 High signal connector. A CAN1 High signal may occur when the CANbus high wire is transmitting a 1 for data. The socket 832 may function as a CAN1 Low signal connector. A CAN1 Low signal may occur when the CANbus low wire is transmitting a 1 for data. The socket 834 may function as another optional ground signal connector. The socket 836 may be another reserved socket that currently has no existing connection (e.g., it can be configured for specific use). The socket 838 may function as a reserved connector for output. The socket 840 may be operated as another reserved socket that has no current connection. In some embodiments, the socket 804, the socket 808, the socket 810, the socket 814, and the socket 818 are all required communication connectors for battery 800. The color column may denote the color of the connection within the battery 800.

Referring now to FIG. 22, a paralleling diagram for communication connectors for a simplified application is shown, according to an exemplary embodiment. One simplified application that paralleling diagram 900 may be used for is to supply power to a machine (e.g., a motor for outdoor power equipment). The paralleling diagram 900 shows the connections between a battery 902, a battery 904, a battery 906, and a battery 908. The parallel diagram 900 may be for a battery system that has more or less batteries than shown in FIG. 22. The connection 914, which may be the positive 5V signal supply in this example, may connect the respective socket 818 of each battery in the paralleling diagram 900. The connection 916, which may be the charge enable signal in this example, may connect the respective socket 814 of each battery 902, 904, 906, 908 in paralleling diagram 900. In some embodiments, the connection 918 is the discharge enable signal and connects the respective socket 804 of each battery. The connection 920, which may be the optional ground connection, may connect the respective socket 812 of every battery in paralleling diagram 900. The connection 922 may be for the optional positive 12V output and may connect respective socket 806 of each battery in paralleling diagram 900. The connection 924 may be for the CAN0 High, may connect the respective socket 808 of each battery 902, 904, 906, 908 in the paralleling diagram 900. Connection 926, which may be for the CAN0 Low signal, may connect the respective socket 810 of each battery in the battery system. The connection 920 and connection 922 can both be optional connections within paralleling diagram 900.

In some embodiments, all signal wires in the application communication connectors for the paralleling diagram 900 are 20 AWG. The wires used for the positive 12V output connection 922 and ground connection 920 are 16 AWG wire. Additionally, all CANbus wiring may be twisted-pair (e.g., connection 924 for CAN0 High signal and connection 926 for CAN0 Low signal are both twisted-pair wires), as shown in FIG. 22 with the twisted-pair wire 910. The charger connection may provide the charge enable (i.e., switch) connection 916. A 120-Ohm terminating resistor 912 is shown coupled to the connection 924 and the connection 926 between the CAN0 High and the CAN0 Low signals. A 120-Ohm terminating resistor may be required at the end of each wiring run, such that there is a total of two 120-Ohm resistors per CANbus communication system. To enter 'discharge mode,' and therefore 'turn on' a battery, the positive 5V signal supply may be connected (i.e., switched) to a discharge enable signal. For example, the connection 914 is switched to the connection 916 in the paralleling diagram 900 to 'turn on' battery 902, battery 904, battery 906, and battery 908.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein. The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A battery pack, comprising:
   a battery pack housing;
   a cell module assembly arranged within the battery pack housing and having a plurality of lithium-ion battery cells connected in parallel;
   a primary power output connector including a pair of terminals electrically connected to the battery pack to define a primary power output, wherein the primary power output connector extends through an outer panel in the battery pack housing; and
   a secondary power output connector, wherein the secondary power output connector extends through the outer panel in the battery pack housing, wherein the secondary power output connector includes a secondary power output; and
   wherein the primary power output connector is configured to supply electrical power at a voltage higher than the secondary power output connector, wherein the secondary power output connector includes:
   a discharge enable terminal pin;
   a charge enable terminal pin; and
   a supply terminal pin, wherein the supply terminal pin outputs a supply signal to the discharge enable terminal pin to turn on the battery pack.

2. The battery pack of claim 1, wherein the secondary output connector further supports connector pinouts to send and receive digital input and digital output.

3. The battery pack of claim 1, wherein the secondary power output is rated at 12 Volts and the primary power output is rated at 48 Volts.

4. The battery pack of claim 1, wherein the secondary power output provides electrical power to indicators displaying that electrical power is being supplied from the battery cells through the primary power output.

5. The battery pack of claim 1, wherein the secondary power output supplies power to a relay positioned on a piece of outdoor power equipment, wherein the piece of outdoor power equipment simultaneously receives power through the primary power output.

6. The battery pack of claim 1, wherein the battery pack is configured to transmit electrical power through the primary power output and the secondary power output simultaneously.

7. The battery pack of claim 1, wherein the battery pack is configured to communicate through a 29-bit Controller Area Network bus network, wherein the secondary power output connector includes at least one Controller Area Network pinout.

8. A battery pack, comprising:
a housing;
a cell module assembly received within the housing, the cell module assembly having a plurality of lithium-ion battery cells connected in parallel;
a 48 Volt primary power output connector including a pair of terminals electrically connected to the battery pack, wherein the 48 Volt primary power output connector extends through an outer panel in the housing; and
a 12 Volt secondary power output connector, wherein the 12 Volt secondary power output connector extends through the outer panel in the housing, wherein the secondary power output connector includes a secondary power output, wherein the 12 Volt secondary power output connector includes:
a charge enable terminal pin;
a discharge enable terminal pin; and
a supply terminal pin, wherein the supply terminal pin outputs a supply signal to the discharge enable terminal pin to turn on the battery pack; and
wherein the pair of terminals and the secondary power output connector are arranged on a connector plate coupled to the housing.

9. The battery pack of claim 8, wherein the secondary power output connector is positioned on the connector plate between the pair of terminals.

10. The battery pack of claim 8, wherein the plurality of lithium-ion battery cells comprises ten or more lithium ion battery cells.

11. The battery pack of claim 10, wherein the plurality of lithium-ion battery cells comprises thirty-two lithium ion battery cells.

12. The battery pack of claim 11, wherein the thirty-two lithium ion battery cells are arranged in a 1S32P arrangement.

13. The battery pack of claim 11, wherein the thirty-two lithium ion battery cells are arranged in a 2S16P arrangement.

14. A battery pack, comprising:
a cradle defining a base surface;
a housing suspended by the cradle above the base surface;
a cell module assembly received within the housing, the cell module assembly having a plurality of lithium-ion battery cells connected in parallel;
a primary power output connector including a pair of terminals formed through the housing, wherein the primary power output connector includes a primary power output; and
a secondary power output connector formed through the housing, wherein the secondary power output connector includes a secondary power output, wherein the secondary power output connector includes:
a charge enable terminal pin;
a discharge enable terminal pin; and
a supply terminal pin, wherein the supply terminal pin outputs a supply signal to the discharge enable terminal pin to turn on the battery pack; and
wherein the primary power output is configured to supply electrical power at a voltage higher than the secondary power output connector.

15. The battery pack of claim 14, wherein each of the pair of terminals and the secondary power output connector extend through a connector plate coupled to the housing.

16. The battery pack of claim 14, wherein the secondary power output is rated at 12 Volts and the primary power output is rated at 48 Volts.

17. The battery pack of claim 14, wherein the secondary power output connector is at least partially defined by a cylindrical boss extending outwardly away from the housing.

18. The battery pack of claim 14, wherein the secondary power output supplies power to a relay positioned on a piece of outdoor power equipment, wherein the piece of outdoor power equipment simultaneously receives power through the primary power output.

19. The battery pack of claim 18, wherein the battery pack is configured to communicate through a 29-bit Controller Area Network bus network, wherein the secondary power output connector includes at least one Controller Area Network pinout.

* * * * *